US009584988B2

(12) United States Patent
Schmidt et al.

(10) Patent No.: US 9,584,988 B2
(45) Date of Patent: Feb. 28, 2017

(54) COMMUNICATION TERMINAL, COMMUNICATION DEVICE, METHOD FOR PROCESSING A PAGING MESSAGE AND METHOD FOR CONTROLLING A COMMUNICATION TERMINAL

(71) Applicant: INTEL DEUTSCHLAND GMBH, Neubiberg (DE)

(72) Inventors: Andreas Schmidt, Braunschweig (DE); Maik Bienas, Schöppenstedt (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 535 days.

(21) Appl. No.: 13/787,965

(22) Filed: Mar. 7, 2013

(65) Prior Publication Data
US 2014/0256365 A1  Sep. 11, 2014

(51) Int. Cl.
H04W 4/12 (2009.01)
H04W 76/02 (2009.01)
H04W 4/22 (2009.01)
H04W 68/00 (2009.01)

(52) U.S. Cl.
CPC ............ H04W 4/12 (2013.01); H04W 4/22 (2013.01); H04W 76/023 (2013.01); H04W 68/00 (2013.01)

(58) Field of Classification Search
CPC ....... H04W 4/12; H04W 4/22; H04W 76/023; H04W 68/00
USPC ......................................................... 455/466
See application file for complete search history.

(56) References Cited

U.S. PATENT DOCUMENTS

2009/0017843 A1* 1/2009 Laroia et al. ................. 455/458
2011/0189999 A1* 8/2011 Mueck .......................... 455/450
2012/0184306 A1* 7/2012 Zou .......................... H04W 76/023
                                            455/458
2013/0297810 A1* 11/2013 Ho ........................... H04W 76/028
                                            709/228

FOREIGN PATENT DOCUMENTS

WO       2009009394 A1    1/2009

OTHER PUBLICATIONS

European Patent Office; International Search Report and Written Opinion for PCT App. No. PCT/EP2014/053130, mailed Sep. 8, 2014; 8 pages.
3GPP TS 36.300 v10.7.0 (Mar. 2013); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); pp. 1-194.
(Continued)

*Primary Examiner* — Nathan Mitchell
(74) *Attorney, Agent, or Firm* — Schwabe, Williamson & Wyatt, P.C.

(57) ABSTRACT

A communication terminal is described comprising a receiver configured to receive a paging message, a detector configured to determine whether the paging message includes an indication to prepare a direct communication device to communication device communication and a controller configured to prepare a direct communication device to communication device communication if the paging message includes an indication to prepare a direct communication device to communication device communication.

18 Claims, 15 Drawing Sheets

(56) References Cited

OTHER PUBLICATIONS

3GPP TS 36.101 v10.6.0 (Mar. 2012); 3rd Generation Partnership Project; Technical Specification Group Radio Access Network; Evolved Universal Terrestrial Radio Access (E-UTRA); User Equipment (UE) radio transmission and reception (Release 10); pp. 1-312.

3GPP TS 36.304 v10.5.0 (Mar. 2012); 3rd Generation Partnership Project; Technical Specification Group Radio Access Network; Evolved Universal Terrestrial Radio Acess (E-UTRA); User Equipment (UE) procedures in idle mode (Release 10); pp. 1-33.

3GPP TS 36.306 v10.1.0 (Mar. 2011); 3rd Generation Partnership Project; Technical Specification Group Radio Access Network; Evolved Universal Terrestrial Radio Acess (E-UTRA); User Equipment (UE) radio access capabilities (Release 10); pp. 1-18.

3GPP TS 36.321 v10.5.0 (Mar. 2012); 3rd Generation Partnership Project; Technical Specification Group Radio Access Network; Evolved Universal Terrestrial Radio Acess (E-UTRA); Medium Access Control (MAC) protocol specification (Release 10); pp. 1-54.

3GPP TS 36.331 v10.5.0 (Mar. 2012); 3rd Generation Partnership Project; Technical Specification Group Radio Access Network; Evolved Universal Terrestrial Radio Acess (E-UTRA); Radio Resource Control (RRC); Protocol specification (Release 10); pp. 1-302.

3GPP TR 22.803 v0.3.0 (May 2012); 3rd Generation Partnership Project; Technical Specification Group SA; Feasibility Study for Proximity Services (ProSe) (Release 12); pp. 1-24.

\* cited by examiner

COMMUNICATION TERMINAL, COMMUNICATION DEVICE, METHOD FOR PROCESSING A PAGING MESSAGE AND METHOD FOR CONTROLLING A COMMUNICATION TERMINAL

TECHNICAL FIELD

The present disclosure relates to a communication terminal, a communication device, a method for processing a paging message and a method for controlling a communication terminal

BACKGROUND

3GPP (Third Generation Partnership Project) is currently in a process of studying use cases and identifying potential requirements for operator controlled discovery of and direct communication between mobile devices that are in close proximity. This activity is commonly known as "ProSe" (Proximity Services). It is expected that the corresponding technical stage 2 work on this topic starts soon when work on 3GPP Rel-12 begins. Possible use cases for direct UE-to-UE communication are for example: commercial use, social use, network offloading, UEs acting as mobile relays (e.g., for purposes such as coverage extension, mitigation of access technology mismatch, and alike), public safety, etc.

The "ProSe" topic can be divided into two parts:
Proximity Detection (this may be infrastructure assisted): This procedure determines whether given proximity criteria are fulfilled ("e.g. a UE (User Equipment) is in proximity of another UE"). The aim is twofold: to discover the proximity of two or more UEs in general and to clarify whether a direct UE-to-UE communication is possible. Criteria can be different for discovery and UE-to-UE communication.
UE-to-UE Communication (this may be under continuous control of the Mobile Network Operator (MNO)).

Direct UE-to-UE Communication is also referred to as "Device-to-Device Communication" or "D2D Communication". There are in principle two alternatives to realize such a direct communication path between mobile devices: the D2D air interface (called Ud in this description) could be realized by some type of short range technology in frequency bands different from the frequency bands used by the cellular network, such as e.g. Bluetooth or WiFi, or by re-using the LTE technology, which may be using the same frequency bands for the D2D communication as used by the cellular network.

In any case, a mobile terminal may have a separate communication module for D2D communication (also referred to herein as Transceiver Module 2) in addition to the cellular communication module used for cellular wide area radio communication between the communication terminal and the communication device. Since the preparation for the D2D communication, e.g. the activation of the communication module, may take some time, approaches to reduce the delay for setting up a D2D communication are desirable.

SUMMARY

A communication terminal is provided including a receiver configured to receive a paging message, a detector configured to determine whether the paging message includes an indication to prepare a direct communication device to communication device communication and a controller configured to prepare a direct communication device to communication device communication if the paging message includes an indication to prepare a direct communication device to communication device communication.

Further, a communication device is provided including a message generator configured to generate a paging message including an indication to prepare a direct communication device to communication device communication and a transmitter configured to transmit the paging message to a communication terminal.

Additionally, a method for processing a paging message according to the above communication terminal and a method for controlling a communication terminal according to the above communication device are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The term "protocol" is intended to include any piece of software that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

For reasons of simplicity, in the following, explanations will be given using LTE and the corresponding entities (e.g. E-UTRAN, EPC and UE), however, it is to be noted that various aspects may also be provided using another cellular wide area radio communication technology and its corresponding entities as will be described in more detail below.

Figure 1:
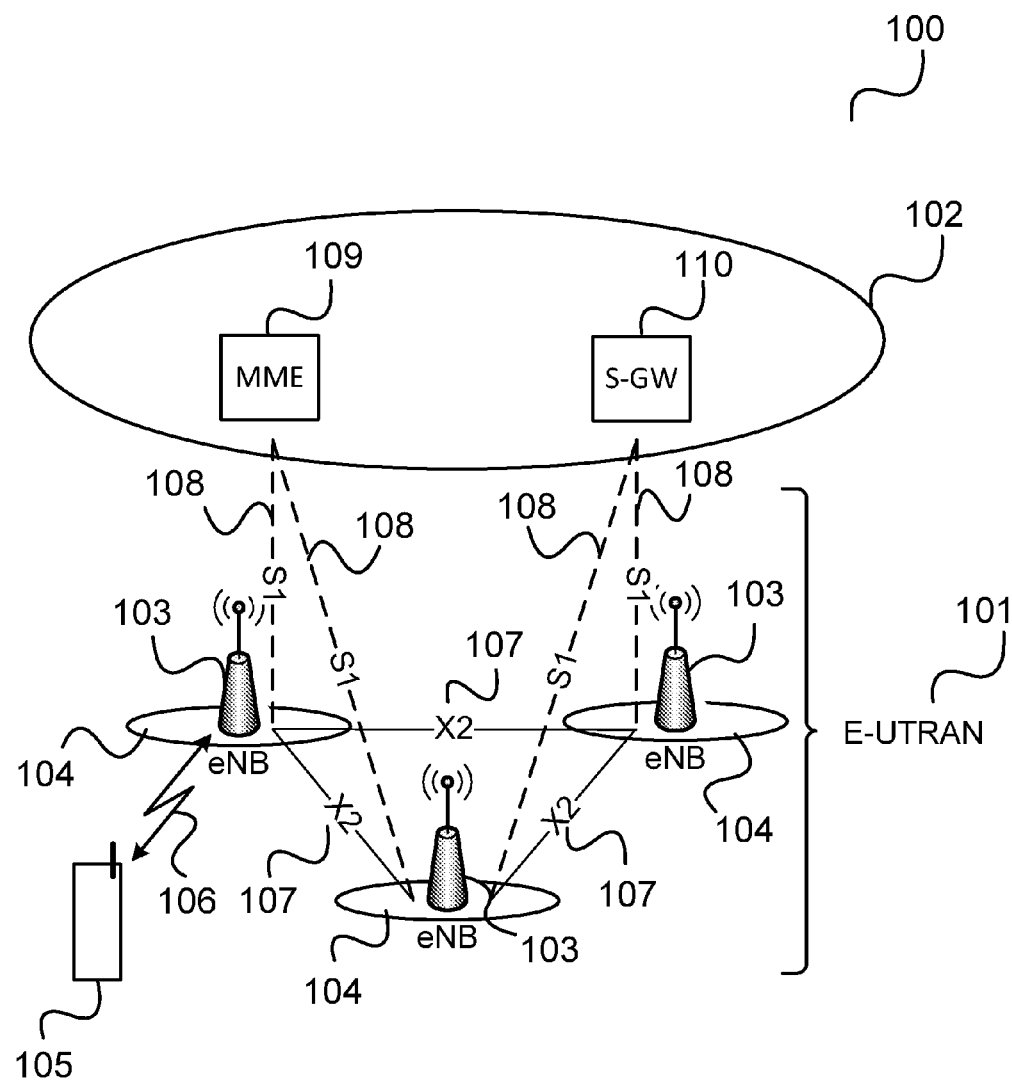
FIG. 1 shows an LTE communication system.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced).

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:

Functions for Radio Resource Management: Radio Bearer Control, Radio Admission Control, Connection Mobility Control, dynamic allocation of resources to UEs 105 in both uplink and downlink (scheduling);

IP header compression and encryption of user data streams;

Selection of an MME 109 at UE 105 attachment when no routing to an MME 109 can be determined from the information provided by the UE 105;

Routing of User Plane data towards Serving Gateway (S-GW) 110;

Scheduling and transmission of paging messages (originated from the MME);

Scheduling and transmission of broadcast information (originated from the MME 109 or O&M (Operation and Maintenance));

Measurement and measurement reporting configuration for mobility and scheduling;

Scheduling and transmission of PWS (Public Warning System, which includes ETWS (Earthquake and Tsunami Warning System) and CMAS (Commercial Mobile Alert System)) messages (originated from the MME 109); and CSG (Closed Subscriber Group) handling.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

A handover may also occur between base stations 103 operating according to different radio access technologies. This is illustrated in FIG. 2.

Figure 2:
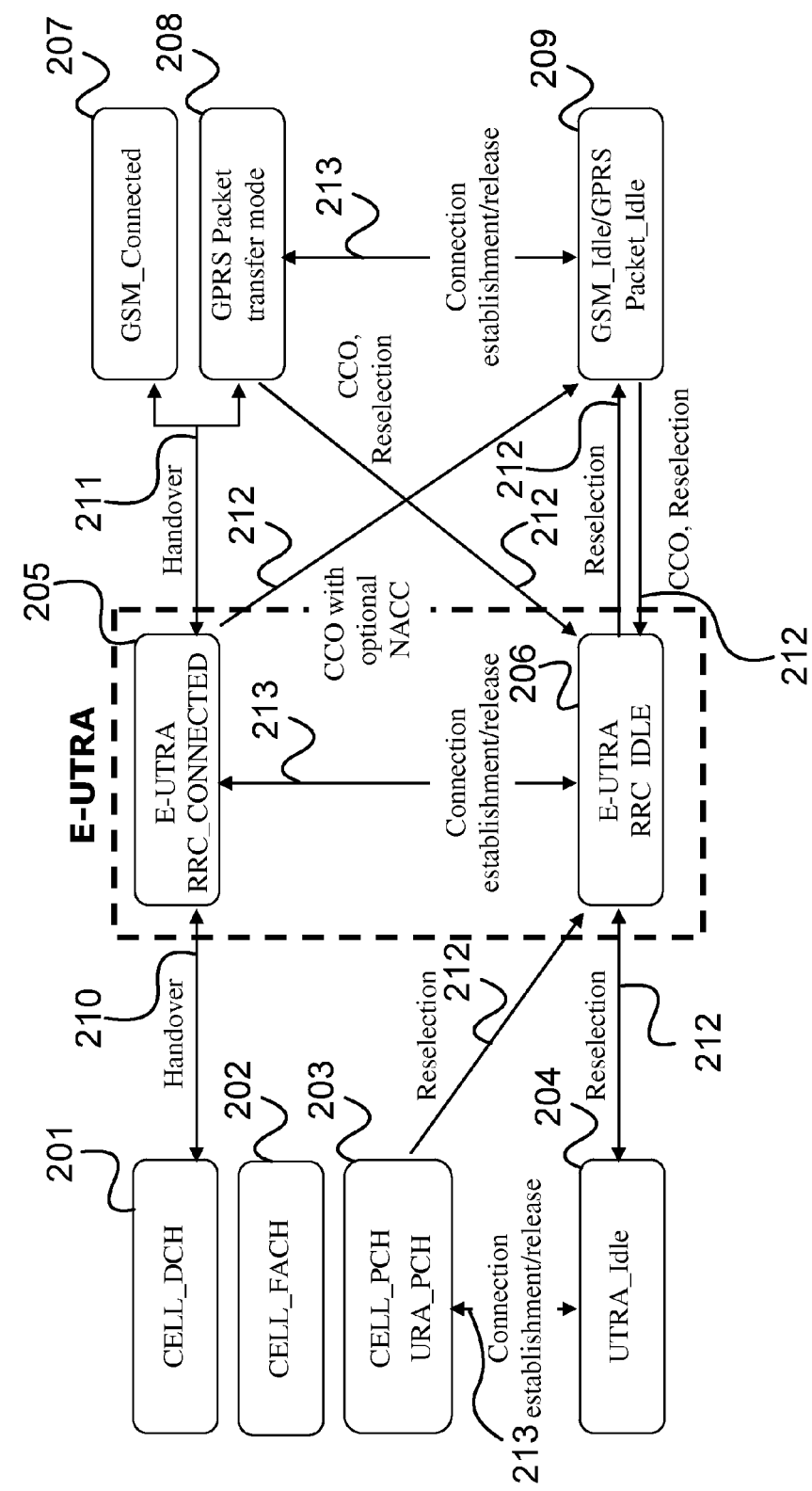
FIG. 2 shows a state diagram including LTE, UMTS and GSM states.

FIG. 2 shows a state diagram 200.

The state diagram 200 includes the UMTS (UTRA, 3G) mobile terminal states CELL_DCH 201, CELL_FACH 202, CELL_PCH/URA_PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM_Connected 207, GPRS Packet Transfer Mode 208, and GSM_Idle/GPRS Packet_Idle 209. Contrary to UMTS, there are only two E-UTRA RRC states defined for the mobile terminal 105. FIG. 2 can be seen to illustrate the mobility support between E-UTRA, UTRA and GERAN.

According to a first state transition 210, a handover may be carried out between E-UTRA (i.e. a base station 103 operating according to LTE) and UTRAN (i.e. a base station 103 operating according to UTMS).

According to a second state transition 211, a handover may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the handover of an active call. It should be noted that state transitions between states of the UTRAN and GERAN are omitted for simplicity but may also be possible.

Fourth state transitions 213 may occur between states of the same radio access technology, e.g. when a connection is released or a connection is established. The mobile terminal 105 is in RRC_CONNECTED when an RRC connection has been established. If this is not the case, i.e. no RRC connection is established, the mobile terminal 105 is in RRC_IDLE state.

The two RRC (Radio Resource Control) states RRC_IDLE and RRC_CONNECTED in E-UTRA can be described as follows:

RRC IDLE
  Mobile terminal specific DRX (Discontinuous Reception) may be configured by upper protocol layers;
  Mobility is controlled by the mobile terminal 105;
  The mobile terminal 105
    may acquire system information (SI);
    monitors a paging channel to detect incoming calls and SI change;
    performs neighboring cell measurements for the cell (re-)selection process.
RRC CONNECTED
  A mobile terminal 105 is in RRC_CONNECTED when an RRC connection has been established.
  Transfer of unicast data to/from the mobile terminal 105;
  Mobility is controlled by the radio access network 101 (handover and cell change order);
  The mobile terminal 105 may be configured with mobile terminal specific DRX (Discontinuous Reception) at lower protocol layers.
  The mobile terminal 105
    may acquire system information (SI);
    monitors a paging channel and/or SIB (system information block) Type 1 content to detect SI change;
    monitors control channels associated with the shared data channel to determine if data is scheduled for it;
    performs neighboring cell measurements and measurement reporting to assist the network in making handover decisions;
    provides channel quality and feedback information to the radio access network 101.

According to DRX the PDCCH (Physical Downlink Control Channel) monitoring activity of the mobile terminal 105 is controlled. On the PDCCH, various RNTIs (Radio Network Temporary Identifiers) can be found.

If the mobile terminal 105 is in RRC_IDLE state it is expected to listen to the P-RNTI (the so-called paging indicator) transmitted on the PDCCH which may announce the presence of a paging message on the PDSCH. If DRX is applied in RRC_IDLE, the mobile terminal 105 only needs to monitor one Paging Occasion (PO) per DRX cycle. System Information (SI) broadcast by the base station 103 controls DRX operation by specifying a mobile terminal specific paging cycle in SIB-Type2. (It should be noted that SIB (System Information Block)-Type2 is received by all mobile terminals camping in a given radio cell, but the equation used by a mobile terminal 105 in RRC_IDLE state to calculate its individual Paging Occasion (PO) has as input variable the subscriber's (i.e. mobile terminal's) unique IMSI (International Mobile Subscriber Identity)).

If DRX is configured in RRC_CONNECTED for a mobile terminal 105, the mobile terminal 105 is allowed to monitor the PDCCH (Physical Downlink Control Channel) discontinuously (in order to save energy); otherwise the mobile terminal 105 monitors the PDCCH continuously. The RRC (Radio Resource Control) layer controls DRX operation by configuring timers and parameters.

Figure 3:
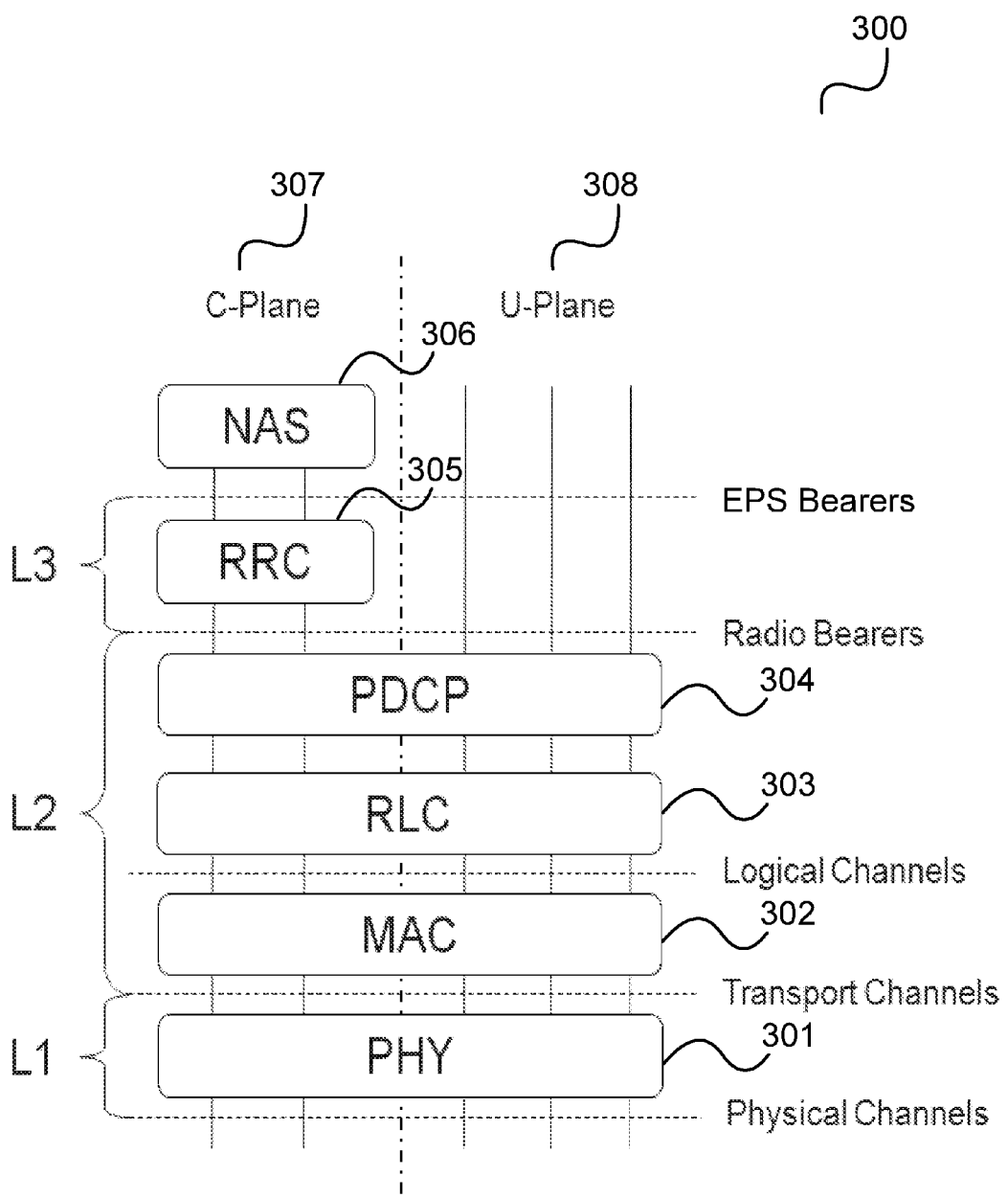
FIG. 3 shows an LTE protocol structure.

The protocols for the C-Plane and the U-Plane of the E-UTRAN 101 according to LTE are illustrated in FIG. 3.

FIG. 3 shows a protocol structure 300.

The LTE air interface (also referred to as Uu interface) is logically divided into three protocol layers. The entities ensuring and providing the functionality of the respective protocol layers are implemented both in the mobile terminal 105 and the base station 103. The bottommost layer is the physical layer (PHY) 301, which represents the protocol layer 1 (L1) according to the OSI (Open System Interconnection) reference model. The protocol layer arranged above PHY is the data link layer, which represents the protocol layer 2 (L2) according to the OSI reference model. In an LTE communication system, L2 consists of plurality of sublayers, namely the Medium Access Control (MAC) sublayer 302, the Radio Link Control (RLC) sublayer 303 and the Packet Data Convergence Protocol (PDCP) sublayer 304. The topmost layer of the Uu air interface is the network layer, which is the protocol layer 3 (L3) according to the OSI reference model and consists of the Radio Resource Control (RRC) layer 305 on the C-Plane 307. On the C-Plane 307, there is further the NAS (Non-Access Stratum) protocol layer 306.

Each protocol layer 301 to 306 provides the protocol layer above it with its services via defined service access points (SAPs). To provide a better understanding of the protocol layer architecture, the SAPs were assigned unambiguous names: The PHY 301 provides its services to the MAC layer 302 via transport channels, the MAC layer 302 provides its services to the RLC layer 303 via logical channels, and the RLC layer 303 provides its services to the PDCP layer 304 as a data transfer function of the RLC mode, i.e. TM (Transparent Mode), UM (Unacknowledged Mode) and AM (Acknowledged Mode). Further, the PDCP layer 304 provides its services to the RRC layer 305 and the U-Plane 308 upper layers via radio bearers, specifically as Signaling Radio Bearers (SRB) to the RRC 305 and as Data Radio Bearers (DRB) to the U-Plane 308 upper layers. According to LTE a maximum of 3 SRBs and 8 DRBs is currently supported.

The radio protocol architecture is not just split horizontally into the above-described protocol layers; it is also split vertically into the "control plane" (C-Plane) 307 and the "user plane" (U-Plane) 308. The entities of the control plane 307 are used to handle the exchange of signaling data between the mobile terminal 105 and the base station 103, which are required among other for the establishment, reconfiguration and release of physical channels, transport channels, logical channels, signaling radio bearers and data radio bearers, whereas the entities of the user plane 308 are used to handle the exchange of user data between the mobile terminal 105 and the base station 103.

According to LTE, each protocol layer has particular prescribed functions:

The PHY layer 301 is primarily responsible for i) error detection on the transport channel; ii) channel encoding/decoding of the transport channel; iii) Hybrid ARQ soft combining; iv) mapping of the coded transport channel onto physical channels; v) modulation and demodulation of physical channels.

The MAC layer 302 is primarily responsible for i) mapping between logical channels and transport channels; ii) error correction through HARQ; iii) logical channel prioritization; iv) transport format selection.

The RLC layer 303 is primarily responsible for i) error correction through ARQ, ii) concatenation, segmentation and reassembly of RLC SDUs (Service Data Unit); iii) re-segmentation and reordering of RLC data PDUs (Protocol Data Unit). Further, the RLC layer 303 is modeled such that there is an independent RLC entity for each radio bearer (data or signaling).

The PDCP layer 304 is primarily responsible for header compression and decompression of IP (Internet Protocol) data flows, ciphering and deciphering of user plane data and control plane data, and integrity protection and integrity verification of control plane data. The PDCP layer 304 is modeled such that each RB (i.e. DRB and SRB, except for SRB0) is associated with one PDCP entity. Each PDCP entity is associated with one or two RLC entities depending on the RB characteristic (i.e. uni-directional or bi-directional) and RLC mode.

The RRC layer 305 is primarily responsible for the control plane signaling between the mobile terminal 105 and the base station 103 and performs among other the following functions: i) broadcast of system information, ii) paging, iii) establishment, reconfiguration and release of physical channels, transport channels, logical channels, signaling radio bearers and data radio bearers. Signaling radio bearers are used for the exchange of RRC messages between the mobile terminal 105 and the base station 103.

Figure 4:
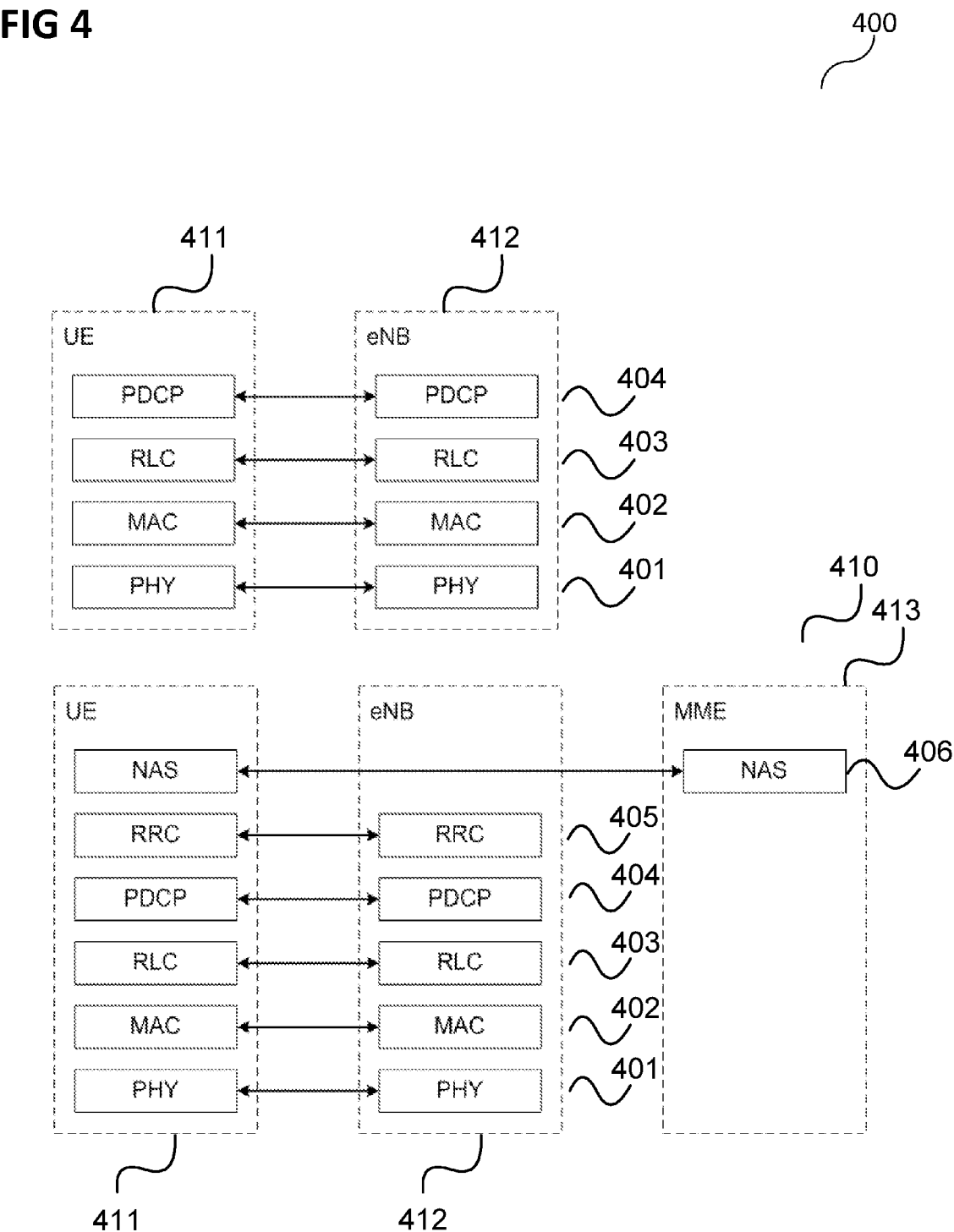
FIG. 4 shows LTE protocol structures.

Differences between the C-Plane (control plane) 307 and the U-Plane (user plane) 308 according to E-UTRA (LTE) technology are depicted in FIG. 4. The RRC protocol and all lower layer protocols (PDCP, RLC, MAC, and PHY) terminate in the eNB 103, while the NAS protocol layer 306 terminates in the MME 109 in the EPC 102.

FIG. 4 shows a first protocol structure 400 and a second protocol structure 410.

The first protocol structure 400 corresponds to the U-Plane and the second protocol structure 410 corresponds to the C-Plane.

Analogously to the illustration as shown in FIG. 3, the protocol structures 400, 410 include a physical layer 401, a MAC layer 402, an RLC (Radio Link Control) layer 403, a PDCP layer 404, an RRC layer 405, and a NAS (Non-Access Stratum) protocol layer 406.

In the physical layer 401, the MAC layer 402, the RLC layer 403, the PDCP layer 404, and the RRC layer 405 the terminal points of the communication are the mobile terminal (UE) 411 and the base station (eNB) 412.

In the NAS protocol layer 406, the terminal points of the communication are the UE 411 and the MME 413.

With LTE the UMTS air interface is further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA/TDMA in downlink direction (tower to handset) and SC-FDMA/TDMA in uplink direction (handset to tower). OFDMA/TDMA is a multicarrier multiple access method in which a subscriber is provided with a defined number of subcarriers in the frequency spectrum and a defined transmission time for the purpose of data transmission. The RF capability of an LTE User Equipment (UE, e.g. a mobile device or a cell phone) for transmission and reception has been set to 20 MHz. A physical resource block (PRB) is the baseline unit of allocation for the physical channels defined in LTE. It includes a matrix of 12 subcarriers by 6 or 7 OFDMA/SC-FDMA symbols. At the physical layer a pair of one OFDMA/SC-FDMA symbol and one subcarrier is called a Resource Element (RE).

The suite of 3GPP LTE specifications describes both Frequency Division Duplexing (FDD) and Time Division Duplexing (TDD) to separate UL and DL traffic but when the first LTE systems were rolled out the MNO's (Mobile Network Operator) preferences dictated that the majority of deployed systems are FDD. In future, the number of TDD systems is expected to rise because some MNOs identified a need for an asymmetric and more flexible UL/DL configuration in their PLMNs (Public Land Mobile Networks), but FDD systems will still be prevalent for some years.

The enhancements for LTE technology are not restricted to the air interface. The core network architecture for 3GPP's LTE wireless communication standard is also enhanced. This endeavor is commonly known as SAE (System Architecture Evolution).

SAE refers to the evolution of the GPRS Core Network, with some differences:
- simplified architecture;
- all IP (Internet protocol) Network (AIPN);
- support for higher throughput and lower latency radio access networks (RANs);
- support for, and mobility between, multiple heterogeneous RANs, including legacy systems as GPRS, but also non-3GPP systems (e.g. WiMAX);

According to the SAE architecture, the main component is the Evolved Packet Core (e.g. forming the core network of the communication system 100 illustrated in FIG. 1). The Evolved Packet Core (EPC) includes:

A Mobility Management Entity (MME): The MME is the key control-node for the LTE radio access network (E-UTRAN) and, according to LTE, holds the following functions:
- NAS signaling;
- NAS signaling security;
- AS (Access Stratum) Security control;
- Inter CN (Core Network) node signaling for mobility between 3GPP access networks;
- Idle mode UE Reachability (including control and execution of paging retransmission);
- Tracking Area List (TAL) management (for UE in idle and active mode);
- PDN GW (Packet Data Network Gateway) and Serving GW selection;
- MME selection for handovers with MME change;
- SGSN (Serving GPRS (General Packet Radio System) Support Node) selection for handovers to 2G or 3G 3GPP access networks;

Roaming;
Authentication;
Bearer management functions including dedicated bearer establishment;
Support for PWS (which includes ETWS and CMAS) message transmission;
Optionally performing paging optimization.

A Serving Gateway (S-GW): The S-GW holds, according to LTE, the following functions:
The local Mobility Anchor point for inter-eNB handover;
Mobility anchoring for inter-3GPP mobility;
E-UTRAN idle mode downlink packet buffering and initiation of network triggered service request procedure;
Lawful Interception;
Packet routing and forwarding;
Transport level packet marking in the uplink and the downlink;
Accounting on user and QCI (QoS (Quality of Service) Class Identifier) granularity for inter-operator charging;
Uplink and Downlink charging per UE, PDN, and QCI.

A PDN Gateway (P-GW): According to LTE, the PDN Gateway provides connectivity from the UE to external packet data networks by being the point of exit and entry of traffic for the UE. A UE may have simultaneous connectivity with more than one P-GW for accessing multiple PDNs. The P-GW performs policy enforcement, packet filtering for each user, charging support, lawful Interception and packet screening. Another key role of the P-GW is to act as the anchor for mobility between 3GPP and non-3GPP technologies such as WiMAX and 3GPP2 (CDMA 1X and EvDO (Evolution Data Optimized)).

In the following, the network architecture of a communication system (e.g. a 3GPP communication system) with three different Radio Access Networks (RANs) is described with reference to FIG. 5 (for the non-roaming case).

Figure 5:
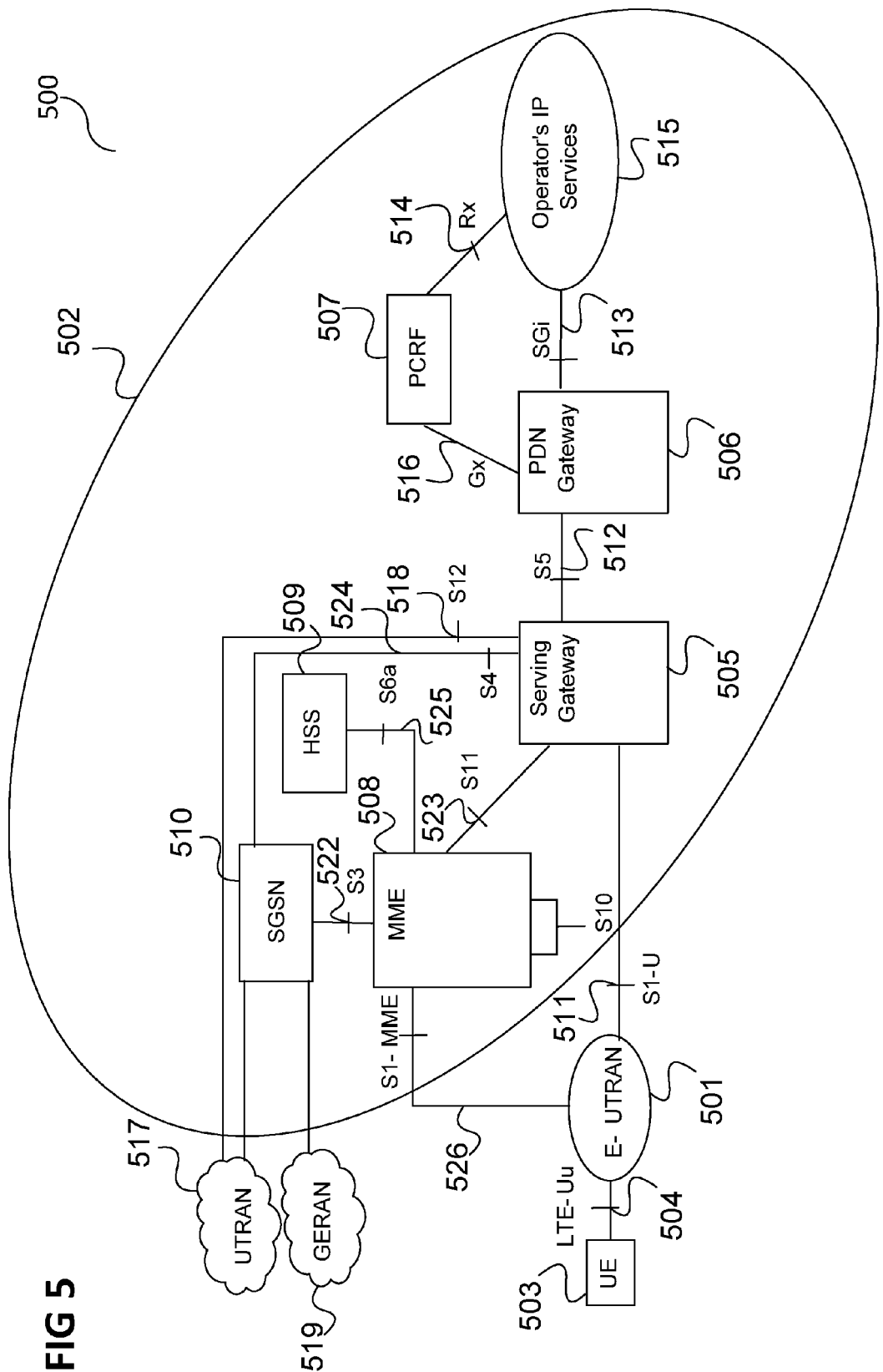
FIG. 5 shows a communication system including a GERAN, a UTRAN, and an E-UTRAN.

FIG. 5 shows a communication system 500.

The communication system 500 includes an E-UTRAN 501 and a core network 502.

The communication system 500 corresponds to the communication system 100 wherein in FIG. 1, the E-UTRAN 101, 501 is shown in higher detail while in FIG. 5, the core network 102, 502 is shown in higher detail.

A mobile terminal 503 which may correspond to the mobile terminal 105 may connect to the E-UTRAN 501 by means of an air interface (Uu interface) 504.

The core network 502 includes a Serving Gateway 505, a PDN (Packet Data Network) Gateway 506, a PCRF (Policy and Charging Rules Function) 507, an MME (Mobility Management Entity) 508, and a HSS (Home Subscriber Server) 509, an SGSN (Serving GPRS (General Packet Radio Service) Support Node) 510.

The E-UTRAN 501 exchanges information or commands with the Serving Gateway 505 by means of an S1-U interface 511. The Serving Gateway 505 is coupled to the PDN Gateway 506 by means of an S5 interface 512. The PDN Gateway 506 and the PCRF 507 may access IP (Internet Protocol) services 515 (i.e. may access, for example, corresponding servers) provided by the operator of the mobile communication system 500 by means of an SGi interface 513 and an Rx interface 514, respectively.

The PCRF 507 is coupled to the PDN Gateway 506 by means of a Gx interface 516. The Serving Gateway 505 is coupled by means of an S4 interface 524 with the SGSN 510. The Serving Gateway 505 may further be coupled to an UTRAN (i.e. a radio access network according to UMTS) 517 via a S12 interface 518. The MME 508 is coupled by means of an S6a interface 525 with the HSS 509. The MME 508 is further coupled by means of an S1-MME interface 526 to the E-UTRAN 501.

The SGSN 510 may support legacy access to the UTRAN 517 and/or a GERAN (GSM (Global System for Mobile Communications) EDGE (Enhanced Data Rates for GSM Evolution) Radio Access Network) 519. The SGSN 510 is coupled with the MME 508 via an S3 interface 522. The Serving Gateway 505 is coupled with the MME 508 via an S11 interface 523.

GERAN is also referred to as 2G and 2.5G. UTRAN is a collective term for the NodeBs and Radio Network Controllers (RNCs) which make up the UMTS radio access network. This communications network, commonly referred to as 3G, can carry many traffic types from real-time Circuit Switched to IP based Packet Switched. The UTRAN includes at least one NodeB (i.e. a UMTS base station) that is connected to at least one Radio Network Controller (RNC). An RNC provides control functionalities for one or more NodeBs. A NodeB and an RNC can be the same device, although typical implementations have a separate RNC located in a central location serving multiple NodeBs. An RNC together with its corresponding NodeBs are called the Radio Network Subsystem (RNS). There can be more than one RNS present per UTRAN.

The E-UTRAN 501 is the 3GPP Radio Access Network for LTE (3.9G) that is currently being worked on. The E-UTRA air interface uses OFDMA for the downlink (i.e. for the transmission direction from the base station to the mobile terminal) and Single Carrier FDMA (SC-FDMA) for the uplink (i.e. for the transmission direction from the mobile terminal to the base station). It employs MIMO (Multiple Input Multiple Output) with up to four antennas per (base and user) station. The use of OFDM enables E-UTRA to be much more flexible in its use of spectrum than the older CDMA based systems, such as UTRAN. OFDM has a link spectral efficiency greater than CDMA, and when combined with modulation formats such as 64QAM, and techniques as MIMO, E-UTRA is expected to be considerably more efficient than W-CDMA (Wideband Code Division Multiple Access) with HSDPA (High Speed Downlink Packet Access) and HSUPA (High Speed Uplink Packet Access).

FIG. 6a and FIG. 6b show diagrams illustrating the frequency spectrum described by 3GPP LTE specification. FIG. 6a shows a diagram 601 illustrating the use of Frequency Division Duplexing (FDD). FIG. 6b shows a diagram 602 illustrating the use of Time Division Duplexing (TDD) to separate uplink (UL) and downlink (DL) traffic. Frequency Division Duplexing (FDD) uses for uplink and downlink a paired spectrum with two distinct frequency bands 603, 604. The downlink frequency band 603 is separated from the uplink frequency band 604. Time Division Duplexing (TDD) uses alternating resource portions for Uplink 605 and Downlink 606 in the same frequency band. Time Division Duplexing (TDD) may use alternating uplink portions 605 and downlink portions 606 in the same frequency band as used by the uplink frequency band in the Frequency Division Duplexing (FDD) shown in FIG. 6a. The frequency band used for the alternating uplink portions 605 and downlink portions 606 may also be the same frequency band as used by the downlink frequency band in the Frequency Division Duplexing (FDD).

Figure 7:
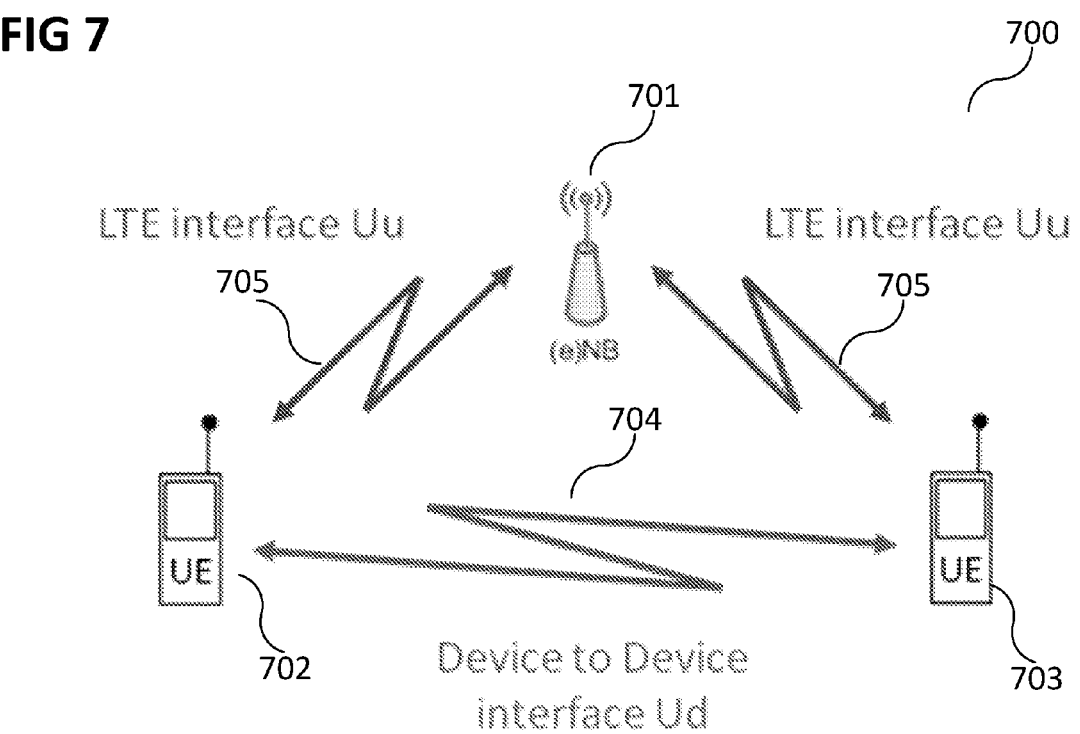
FIG. 7 shows a communication system with a D2D communication.

FIG. 7 shows a communication system 700.

The communication system 700 includes a base station 701, for example corresponding to a base station 103 (also referred to herein as a communication device), a first communication terminal device 702 (e.g. a first UE 702) e.g. corresponding to the mobile terminal 105 and a second communication terminal device 703 (e.g. a second UE 703).

The first communication terminal 702 and the second communication terminal 703 have a direct device to device (D2D) communication 704 bypassing the base station 701, e.g. bypassing the radio access network 101.

The first communication terminal 702 for example includes a first transceiver module (e.g. an LTE communication module) for communication with the base station 701 via the network air interface (e.g. an LTE Uu interface) and a second transceiver module (e.g. a WiFi communication module) for communication with the second communication terminal via the D2D air interface (e.g. the Ud interface). The two transceiver modules can for example be controlled (for instance activated and deactivated) independently from one another.

Direct UE-to-UE Communication may also be referred to as "Device-to-Device Communication" or "D2D Communication". There are in principle two alternatives to realize such a direct communication path between the communication terminal devices 702, 703 (also referred to as mobile devices): a D2D air interface 704 (Ud) may be realized by some type of short range technology, such as e.g. Bluetooth or WiFi, or by re-using the LTE-TDD flavor of the LTE technology. The direct communication connection bypasses the base station 701.

Direct UE-to-UE Communication TDD has many benefits over FDD (by way of example, the same channel characteristics for the transmission path and reception path can be anticipated, and channel estimation using closed loop principles is not needed, etc.).

By way of example, mobile devices that are residing in coverage of an LTE-FDD cell and that want to engage in a direct TDD-based UE-to-UE communication in one of the frequency bands of the radio cell are exposed to interference caused by traffic over the Uu interface 705 in this radio cell. At the same time the D2D traffic over the Ud interface 705 sourced by these types of D2D-UEs 702, 703 may also cause some (local) interference in the DL (downlink) or UL (uplink) band of the radio cell for other UEs being served over the Uu interface 705.

Alternatively, two UEs 702, 703 in RRC_IDLE may be camping on the same base station. At some point in time the two UEs 702, 703 may detect that they are in close proximity and that their D2D technologies (or capabilities to engage in direct UE-to-UE communication) would enable direct exchange of data over the Ud interface 704.

Figure 8:
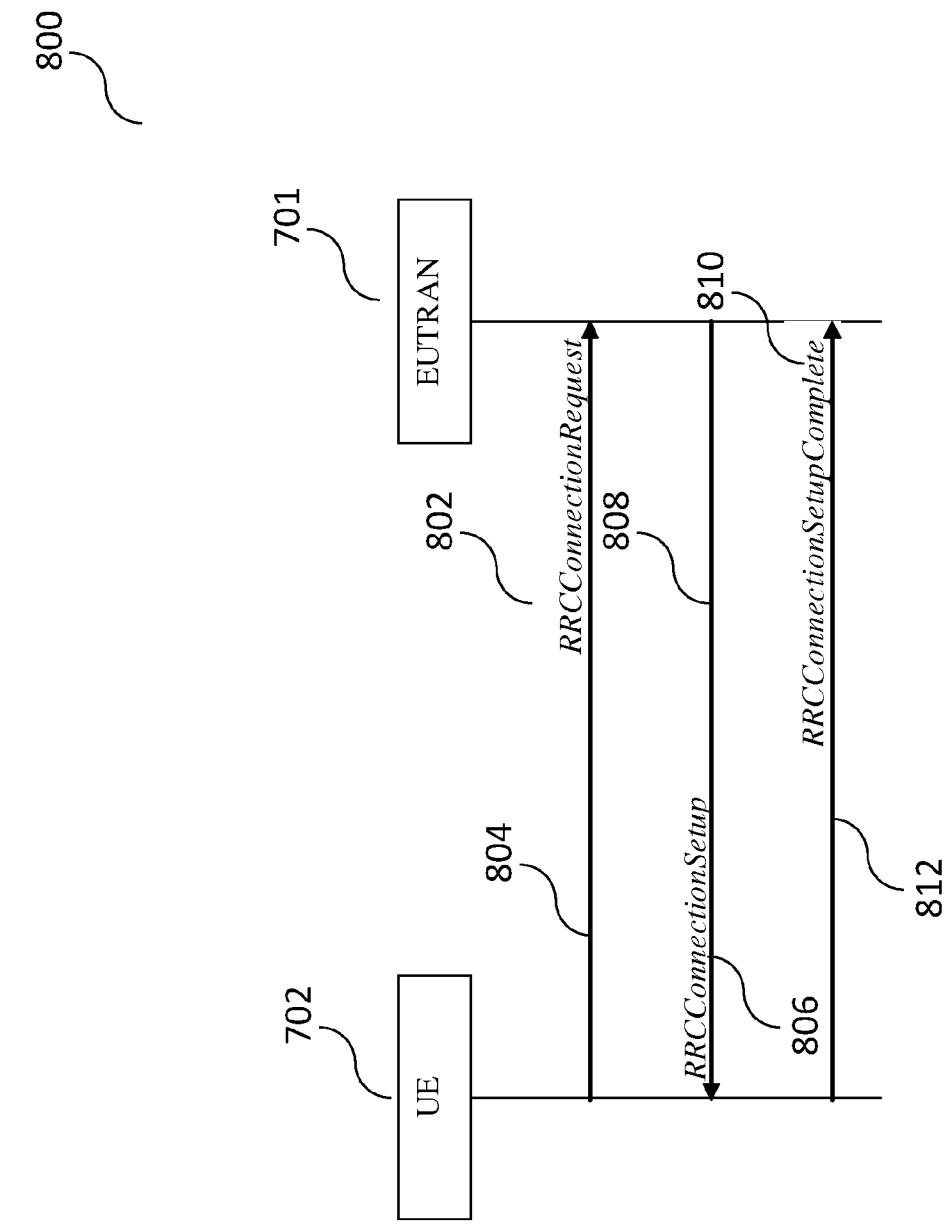
FIG. 8 shows a message flow diagram illustrating a RRC connection establishment procedure.

FIG. 8 shows a message flow diagram 800 illustrating connection establishment between a first UE 702 and the E-UTRAN (e.g. the (e)NodeB 701). This procedure is typically performed by a UE to get initial access to the infrastructure, i.e. the network side. It usually includes random access.

As shown in FIG. 8, upper layer entities in the first UE 702 may initiate an RRC connection establishment procedure. The RRC connection establishment may involve an SRB1 (Signaling Radio Bearer 1) establishment and terminates (in the successful case) with the reception of the RRC Connection Setup Complete message on network side. In more detail, the first UE 702 may generate an RRC Connection Request message 802 and may transmit the same to the E-UTRAN (e.g. the (e)NodeB 701) in 804 over the cellular air interface (Uu interface in case of LTE). Upon receipt of the RRC Connection Request message 802, the (e)NodeB 701 may generate an RRC Connection Setup message 806 and may transmit the same to the first UE 702 in 808. Furthermore, upon receipt of the RRC Connection Setup message 806, the first UE 702 may generate an RRC Connection Setup Complete message 810 and may transmit the same to the E-UTRAN (e.g. the (e)NodeB 701) in 812 to complete the establishment procedure.

The random access procedure, which is a MAC (Medium Access Control) procedure, is an integral part of the RRC connection establishment. RRC may control the random access procedure. The objective of the RRC connection establishment procedure is to perform a state transition from RRC_IDLE to RRC_CONNECTED. There can be several reasons for this: Traffic is generated in the UE for transmission in UL (uplink) direction (mobile originated traffic), or the UE was instructed to switch to RRC_CONNECTED by means of a preceding paging event (i.e. by previous reception of a Paging-Indicator on PDCCH followed by reception of a RRC-Paging-Message on the PDSCH). Paging may occur for instance when an event of downlink data arrival destined for this UE is detected in the EPC (mobile terminated traffic).

Figure 9:
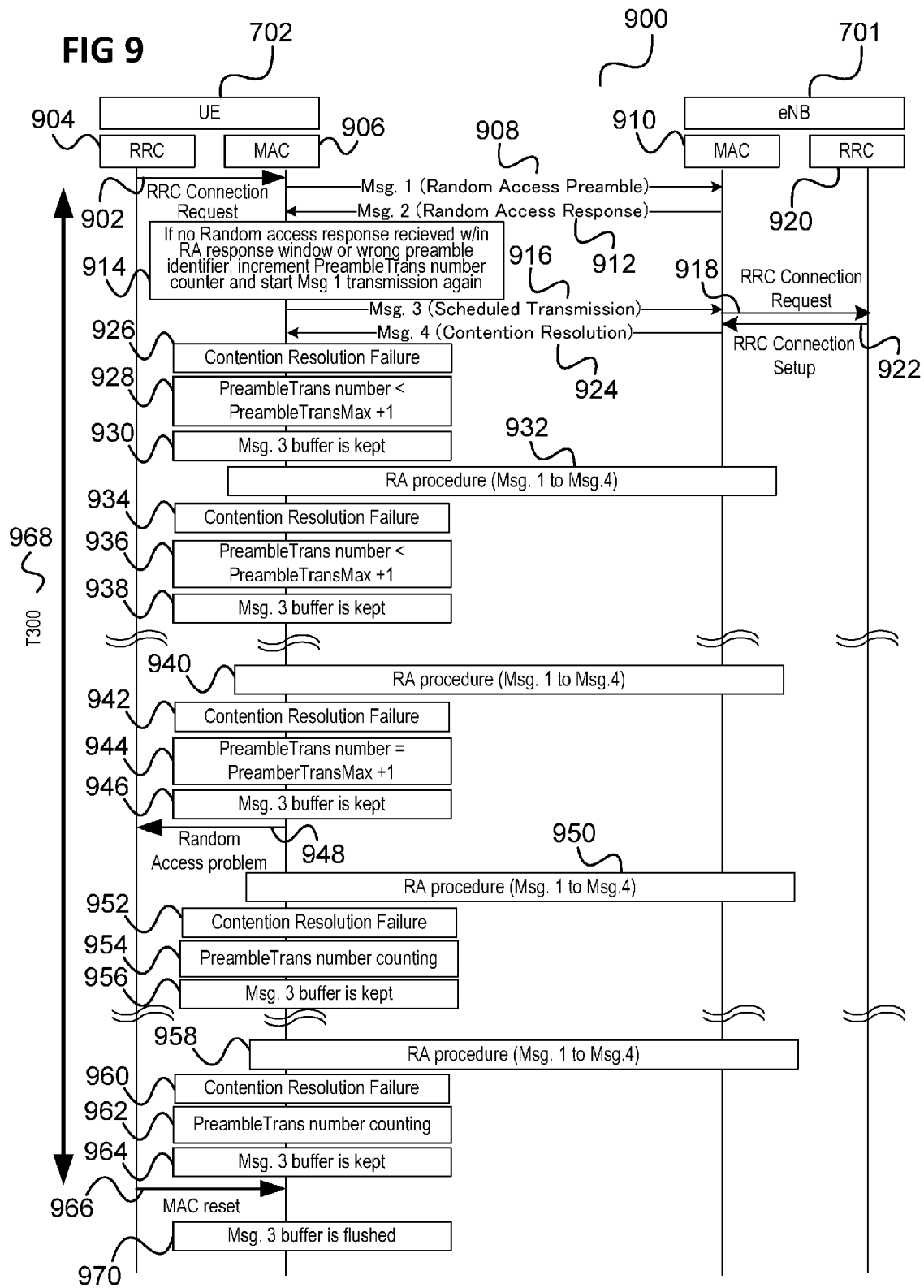
FIG. 9 shows the relationship between the RRC connection establishment procedure and the random access procedure.

The relationship between the RRC connection establishment procedure and the random access procedure in the first UE 702 and in the eNodeB 701 is shown in FIG. 9. Specifically, an (unsuccessful) random access procedure with many contention problems is shown.

FIG. 9 shows a flow diagram 900.

The flow takes place between the UE 702 and the base station 701.

An RRCConnectionRequest message 902 (which is transferred from an RRC entity 904 of the first UE 702 to a MAC entity 906 of the first UE 702 on the uplink CCCH (Common Control Channel) logical channel) may kick off the random access process on UE 702 side. In a first message (message #1) 908 a random access Preamble is sent to a MAC entity 910 of the (e)NodeB 701 using random access resources in uplink direction. Then, a random access Response is generated by the MAC entity 910 on eNB 701 side and conveyed on the DL-SCH transport channel in a second message (message #2) 912. In 914, if no random access response is received by the MAC entity 906 on UE side 702 within a random access response window or with the correct preamble identifier, the MAC entity 906 increments its preamble transmission (PreambleTrans) number counter and starts again with 908.

Assuming, in this example, that the MAC entity 906 on UE side 702 successfully receives the random access response, the MAC entity 906 on UE side 702 in response generates and conveys in a "first scheduled transmission" in uplink direction a RRCConnectionRequest in a third message (message #3) 916. On eNB 701 side, this third message 916 is passed on from the MAC entity 910 to the RRC entity 920 as RRCConnectionRequest message 918. The RRCConnectionRequest message 918 received by the RRC entity 920 in the eNB 701 may be of the same content as the RRCConnectionRequest message 902 submitted by the RRC entity 904 in the UE 702. The RRC entity 920 on eNB 701 side may now answer the UE by generating an RRCConnectionSetup message 922. The RRCConnectionSetup message 922 is conveyed on the downlink CCCH logical channel in a fourth message (message #4) 924 as a contention resolution.

It is assumed in this example that the MAC entity 906 detects a contention resolution failure in 926. It is further assumed that the MAC entity 906 determines in 928 that the Preamble Transmission number is smaller than the Preamble TransMax (transmission maximum) value+1. Since this is the case, the MAC entity 906 keeps the message #3 buffer in 930 and the random access procedure including the exchange of messages in 908, 912, 916 and 924 is repeated in 932.

It is assumed that again, in 934, the MAC entity 906 detects a contention resolution failure. It is assumed that still, the MAC entity 906 determines in 936 that the preamble transmission number is smaller than the Preamble TransMax (transmission maximum) value+1, keeps the keeps the message #3 buffer in 938 and repeats the random access procedure including the exchange of messages in 908, 912, 916 and 924 is repeated in 940. Eventually, e.g. after additional repetitions of the random access procedure, after another detection of a contention resolution failure in 942, the preamble transmission number is equal to the Preamble TransMax value+1. In response to the determination of this in 944, the MAC entity 906 still keeps the message #3 buffer in 946 but reports a random access problem to the RRC entity 904 in 948.

The MAC entity 906 may again repeat the random access procedure in 950 and, after determining a further contention resolution failure in 952, may further keep on incrementing the preamble transmission counter in 954 and keep the message #3 buffer in 956.

This process may again repeat one or more times in 958, 960, 962 and 964 until the RRC entity 904 transmits a MAC reset in 966 in response to the expiry of a T300 timer 968 (for termination of the connection establishment) and the MAC entity 906 flushes the message #3 buffer in 970 and the random access procedure has failed.

The T300 timer can take on values in the magnitude of up to two seconds. As can be seen, in case of successful connection establishment, the time between reception of a paging message (received prior to the RRCConnectionRequest message and not shown in FIG. 9) and the end of the RRC connection establishment procedure (i.e., the successful reception of an RRCConnectionSetupComplete message on the network side, also not shown in FIG. 9, as FIG. 9 only shows the unsuccessful case) may vary, depending on the number of repetitions of the random access procedure. If the UE 702 faces a lot of contention resolution problems, this time may grow. The time until an RRC Connection between the UE 702 and the eNodeB 701 is established may even become significantly larger than two seconds when the first connection establishment is not successful and a further one needs to be kicked off.

As can be seen from this example, even if the connection establishment does not fail, a successful setup of an RRC connection may take a significant amount of time (e.g. up to two seconds). In the following, a communication terminal, a communication device and corresponding methods are described that may for example be used to use this time for preparing for a direct device to device communication.

Figure 10:
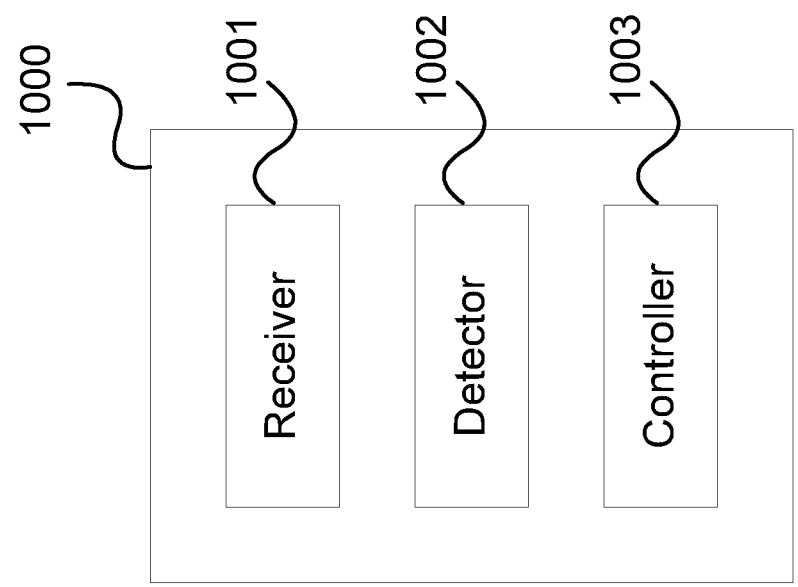
FIG. 10 shows a communication terminal.

FIG. 10 shows a communication terminal 1000.

The communication terminal 1000 includes a receiver 1001 configured to receive a paging message and a detector 1002 configured to determine whether the paging message includes an indication to prepare a direct communication device to communication device communication.

Further, the communication terminal 1000 includes a controller 1003 configured to prepare a direct communication device to communication device communication if the paging message includes an indication to prepare a direct communication device to communication device communication.

In other words, a communication terminal may be requested using a paging message to prepare for a direct device to device (D2D) communication. This may for example allow the communication terminal to use the time necessary for setting up an RRC connection for already preparing for the device to device communication (the specifics of which are then for example signaled via the RRC connection). Compared to the case that the request to prepare for a device to device communication (e.g. to activate a certain communication module) is signaled via the RRC connection, the time until the device to device communication is successfully set up may be reduced.

For example, a D2D capable mobile terminal 105 that for example uses either WiFi or Bluetooth on the Ud wireless link has at least two radio access modules that can be turned on and off independently from one another. The network side (e.g. the core network 102) may for example switch on the WiFi module by means of NAS (Non Access Stratum) signaling between the MME 109 and the mobile terminal 105. However, NAS signaling can only be started after an RRC Connection has been established and all relevant signaling radio bearers have been successfully established. According to FIG. 10, the mobile terminal 105 may turn on the WiFi module upon reception of a paging message, i.e. before the RRC connection establishment procedure as explained with reference to FIG. 8 is completed. The communication terminal does not have to wait for the NAS signaling connection to become available for switching on the D2D transceiver module.

For example, the network side is enabled to indicate a new paging cause to mobile terminals that are being paged. This paging cause may trigger a communication terminal to prepare for (some sort of) D2D activity. A mobile device may then turn on its D2D module (which may for instance be a WiFi module or a Bluetooth module) right away, i.e. that for example some basic D2D proximity detection algorithms can be performed before the RRC connection establishment procedure is completed. The D2D module is also referred to herein as Transceiver Module 2.

The indication may for example indicate that the communication terminal is to allocate resources for a direct communication device to communication device communication and the controller may for example be configured to allocate resources for a direct communication device to communication device communication if the paging message includes the indication.

The resources for example include memory space and/or computational resources.

The communication terminal may for example include a direct communication device to communication device communication module (also referred to herein as Transceiver Module 2), the indication may for example indicate that the communication terminal is to activate the direct communication device to communication device communication module and the controller may for example be configured to activate the direct communication device to communication device communication module if the paging message includes the indication.

For example, the direct communication device to communication device communication module includes a short range communication transceiver.

For example, the direct communication device to communication device communication module is a WiFi communication module or a Bluetooth communication module.

The receiver is for example configured to receive the paging message from a base station of a cellular radio communication network and the direct communication device to communication device communication is for example a communication bypassing the base station.

The direct communication device to communication device communication (in other words D2D communication) is for example a communication with another communication terminal.

Figure 11:
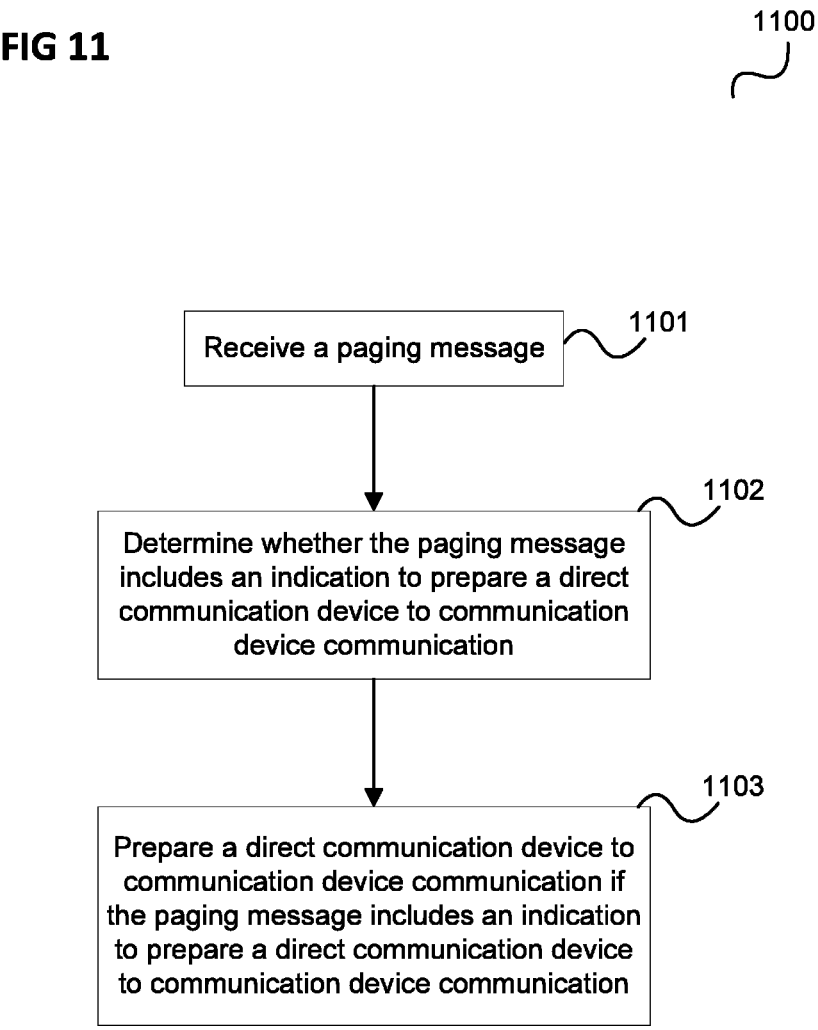
FIG. 11 shows a flow diagram illustrating a method for processing a paging message.

The communication terminal 1000 for example carries out a method as illustrated in FIG. 11.

FIG. 11 shows a flow diagram 1100.

The flow diagram 1100 illustrates a method for processing a paging message, for example carried out by a communication terminal.

In 1101, the communication terminal receives a paging message.

In 1102, the communication terminal determines whether the paging message includes an indication to prepare a direct communication device to communication device communication.

In 1103, the communication terminal prepares a direct communication device to communication device communication if the paging message includes an indication to prepare a direct communication device to communication device communication.

Figure 12:
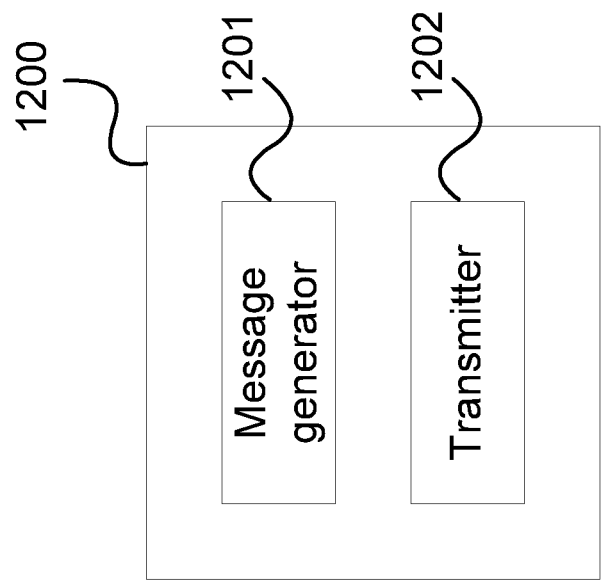
FIG. 12 shows a communication device.

The communication terminal 1000 for example receives the paging message from a communication device as illustrated in FIG. 12.

FIG. 12 shows a communication device 1200.

The communication device 1200 includes a message generator 1201 configured to generate a paging message including an indication to prepare a direct communication device to communication device communication and a transmitter 1202 configured to transmit the paging message to a communication terminal. The communication device 1200 may be a base station of a cellular wide area radio communication network. The paging message may be transmitted over a cellular wide area radio communication interface (e.g., the LTE Uu interface) from the communication device 1200 to the communication terminal 1000.

Figure 13:
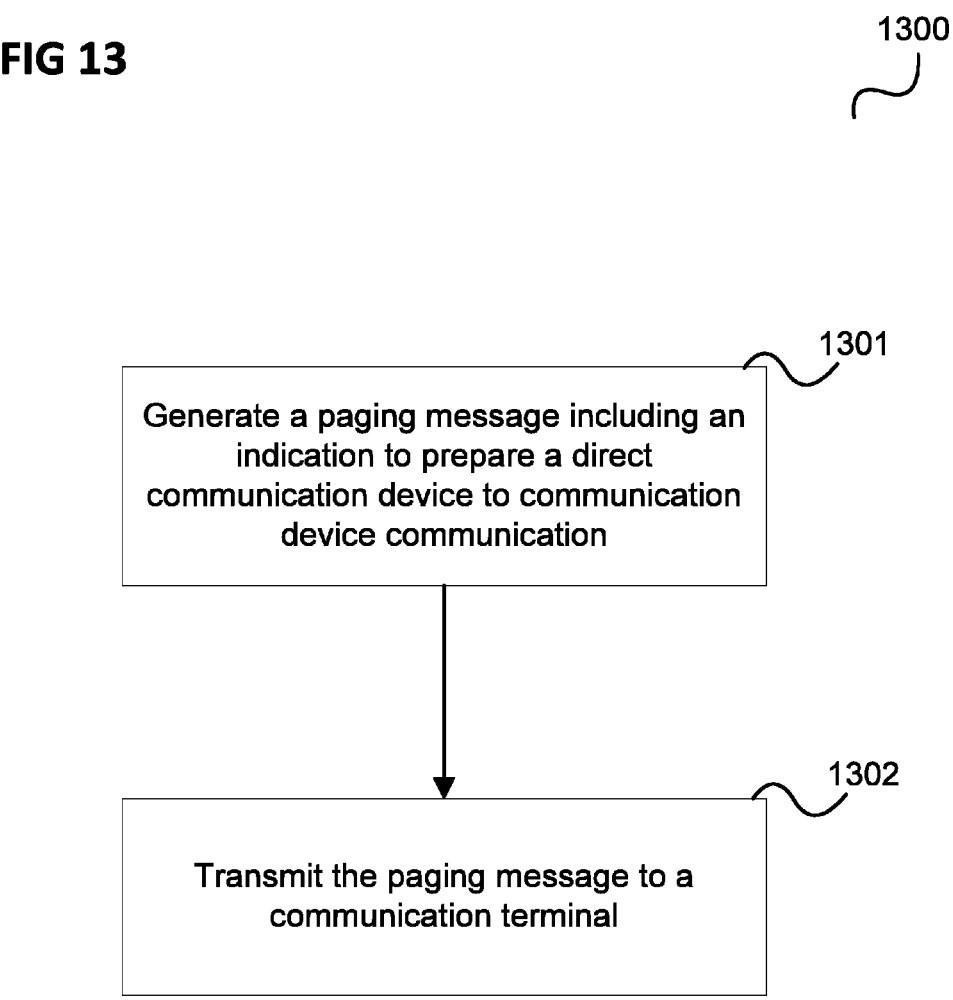
FIG. 13 shows a flow diagram illustrating a method for controlling a communication terminal.

The communication device 1200 for example carries out a method as illustrated in FIG. 13.

FIG. 13 shows a flow diagram 1300.

The flow diagram 1300 illustrates a method for controlling a communication terminal, for example carried out by a communication device.

In 1301, the communication device generates a paging message including an indication to prepare a direct communication device to communication device communication.

In 1302, the communication device transmits the paging message to a communication terminal.

The communication device is for example a base station (or alternatively another network component).

The message generator may for example be configured to include the indication in a section of the paging message applicable for all communication terminals which are to receive the paging message (e.g. in a global part or record of the paging message).

Alternatively, the message generator may be configured to include the indication in a section of the paging message applicable only to the communication terminal (e.g. in a terminal-specific part or record of the paging message).

The message generator may further be configured to include into the paging message a further indication specifying that the cause of the transmission of the paging message is a direct communication device to communication device communication.

It should be noted that examples described in context with the communication terminal 1000 are analogously valid for the communication device 1200 and the methods illustrated in FIGS. 11 and 13 and vice versa.

The components of the communication terminal 1000 and the communication device 1300 (e.g. the receiver, the detector, the controller, the message generator and the transmitter) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

In the following, examples are described in more detail with reference to the architecture as described with reference to FIGS. 1 and 7.

Figure 6:
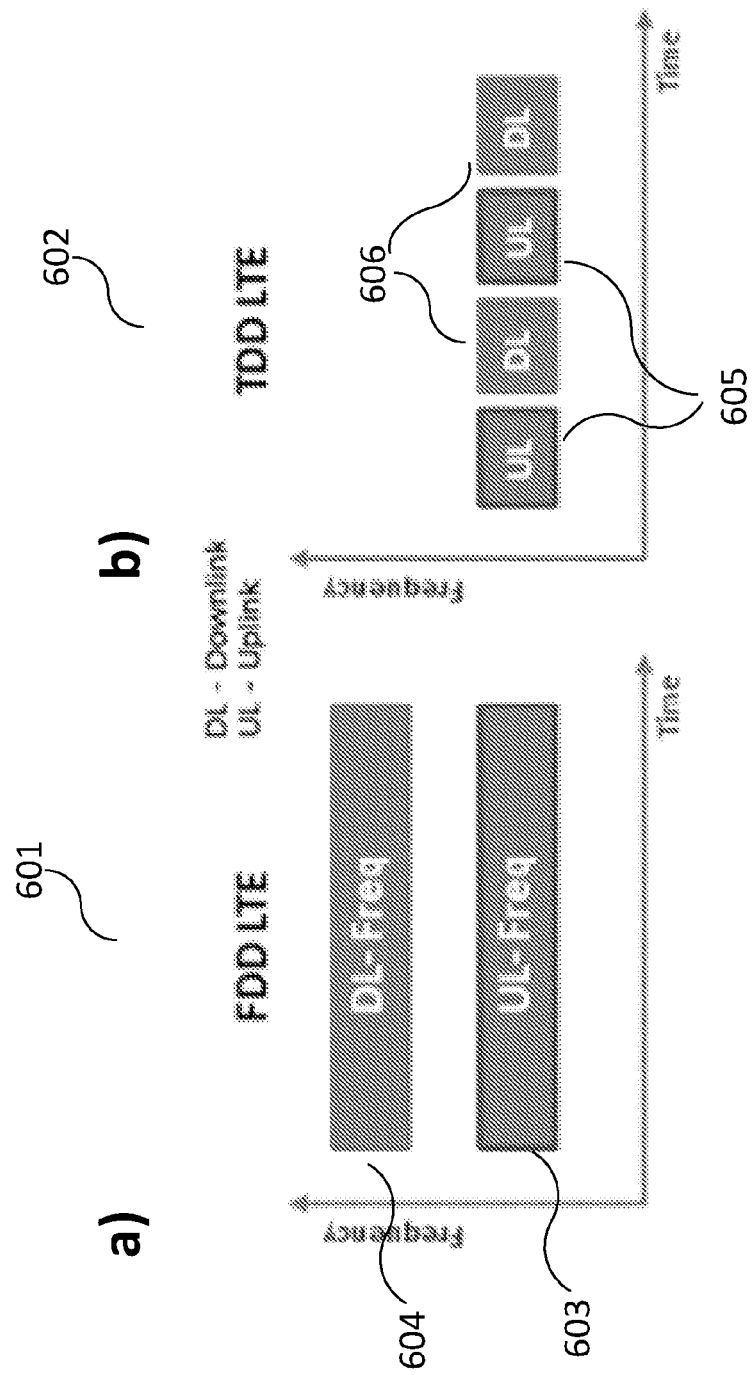
FIGS. 6a and 6b show diagrams illustrating the principles of two duplex methods.

In the following examples, the following (not necessary) assumptions are made:

- The air interface between UE 702 and base station 701 (Uu interface 705) uses LTE-FDD (Frequency Division Duplex);
- The air interface between UE 703 and base station 701 (Uu interface 705) uses LTE-FDD (Frequency Division Duplex);
- The air interface between two (or more) (e.g. mobile) devices (e.g. UEs 702, 703) for direct UE-to-UE communication (Ud interface 704) uses some kind of TDD technology;
- TDD-based D2D on Ud is operated either in the DL band 604 or in the UL band 603 of an LTEFDD paired spectrum as shown in FIG. 6.
- Mobile devices that are engaged in D2D communication (over Ud) don't require an active RRC connection to the MNO's infrastructure (over Uu) during a certain, predetermined time.

In the following example, a paging message is transmitted from the base station 103 operating the radio cell 104 on which the mobile terminal 105 camps including an indication to prepare a D2D communication, or, in other words, a D2D activity.

For paging, in wireless communication systems such as UMTS, a special Paging Indicator Channel is provided in the downlink for a mobile terminal to detect paging messages. The Paging Indicator Channel was specifically designed to enable the mobile terminal to wake up its receiver periodically (for a very short period of time, in order to minimize the impact on battery life) for detecting a paging indicator (that was typically assigned to a group of mobile terminals). The mobile terminal would then keep its receiver switched on to receive a longer message indicating the exact identity of the mobile terminal being paged. In LTE there is no such separate physical channel for this purpose; instead the PDSCH is used for the paging message and the indication is provided via the PDCCH. In LTE, the PDCCH signaling is already very short in duration, and therefore the impact on mobile terminal 105 battery life of monitoring the PDCCH from time to time is low. Therefore the normal PDCCH signaling can be used to carry the (equivalent of a) paging indicator, while the detailed paging information is carried on the PDSCH in a resource block indicated by the PDCCH. Paging indicators sent on the PDCCH use a single fixed identifier called the Paging RNTI (P-RNTI). Rather than providing different paging identifiers for different (groups of) mobile terminals, different (groups of) mobile terminals are typically configured to monitor different sub-frames (paging occasions) for their paging messages.

The purpose of the paging procedure is typically one of the following:

- transmit paging information to a mobile terminal in RRC_IDLE state, and/or
- inform mobile terminals in RRC_IDLE state and in RRC_CONNECTED state about a system information change, and/or
- inform the mobile terminal about PWS (Public Warning System) notifications.

Figure 14:
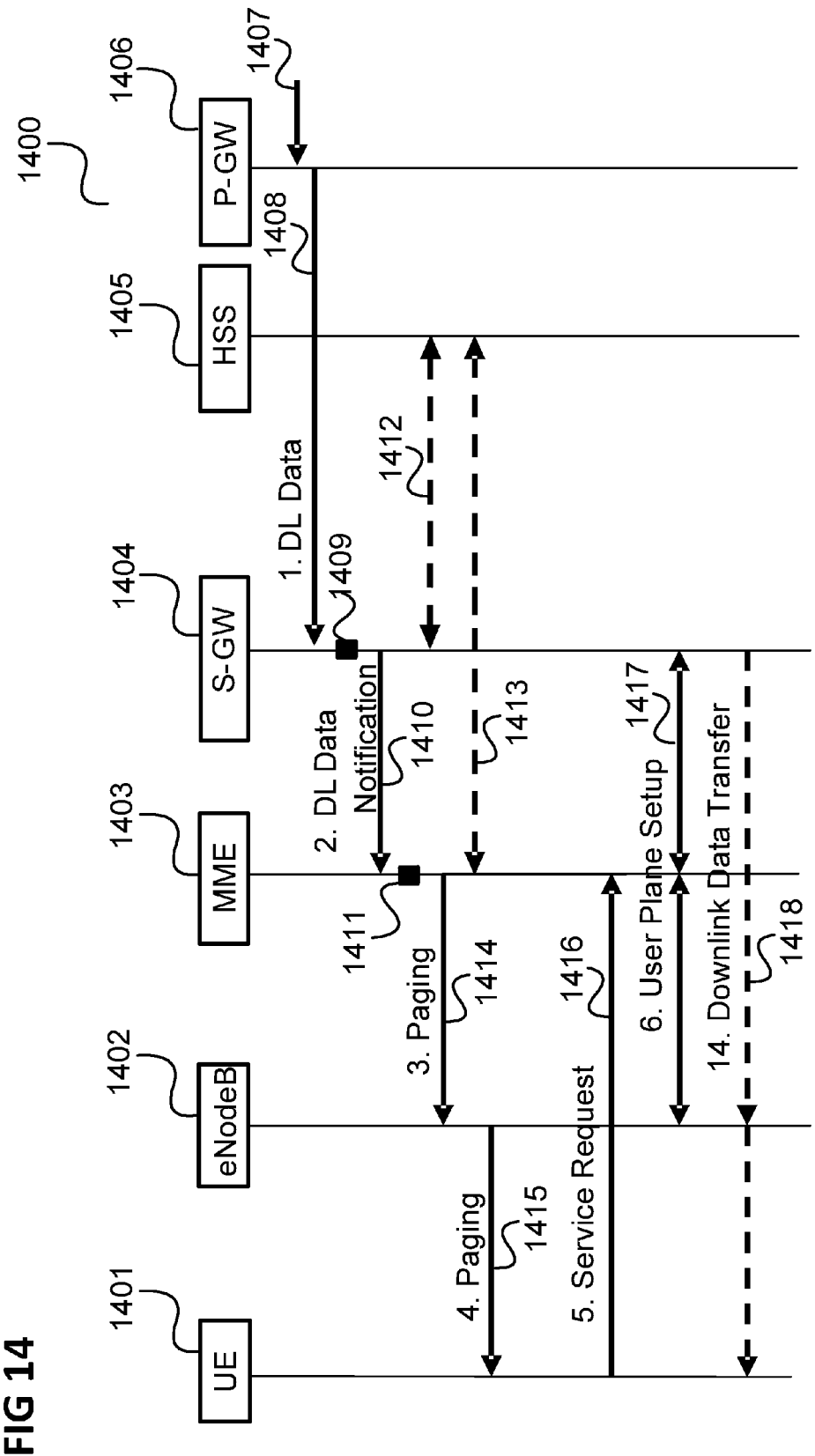
FIG. 14 shows a message flow diagram illustrating a paging procedure.

For example, a paging procedure as illustrated in FIG. 14 is carried out in this example.

FIG. 14 shows a message flow diagram 1400 illustrating a paging procedure.

The message flow takes place between a UE 1401 corresponding to mobile terminal 105, a base station 1402 corresponding to the base station 103 serving the mobile terminal 105 (i.e. operating the radio cell on which the mobile terminal 105 camps), a MME 1403 corresponding to MME 109, an S-GW 1404 corresponding to S-GW 110 and a HSS 1405 and a packet data gateway (P-GW) 1406 which are for example part of the core network 102.

As an example, paging is initiated by the MME 109 when DL data is intended for the UE 105, assumed to be in RRC_IDLE state, arrives at the S-GW 110.

In 1407, data to be transmitted to the UE 1401 arrives at the P-GW 1406.

The P-GW 1406 forwards the data to the S-GW 1404 in 1408.

The S-GW 1404 determines the right MME to be involved in the paging procedure in 1409 and sends a DL data notification to the determined MME 1403 in 1410 notifying the MME 1403 about the data to be transmitted to the UE 1401.

In 1411, the MME 1403 determines the right nodes of the E-UTRAN 101 to contact, e.g. the right base station 103. The MME 1403 is responsible for the Tracking Area List (TAL) management for UEs in RRC_IDLE and therefore knows which nodes of the E-UTRAN 101 (and which radio cells 104) are to be involved in the paging of the UE 1401.

It may be required for the S-GW 1404 and/or the MME 1403 to interrogate the HSS 1405 in 1412 and 1413, respectively, for determining the right MME or the right nodes of the E-UTRAN 101. The HSS 1405 is the master database for a given user containing the subscription-related information to support the network entities actually handling calls/sessions in order to acquire up-to-date information about the UE's whereabouts.

In 1414, the MME 1403 sends a paging request to those eNBs 103 that are relevant for the particular UE 1401 according to the MM Context information (i.e. to all eNBs 103 operating radio cells 104 belonging to the Tracking Areas (TAs) in which the UE 1401 is registered), in this case the base station 1402 for example. The base station 1402 may operate radio cells belonging to different TAs. The base station 1402 transmits, in 1415, to radio cells of the TA in question a paging message (i.e., the preceding Paging-Indicator on PDCCH followed by the actual RRC-Paging-Message on the PDSCH). The base station 1401 transmits the paging message at the UE's paging occasion.

In 1416, the UE 1401 responds with a service request to the MME 1403.

In 1417, a user plane setup is performed and the data are transmitted to the UE 1401 in 1418.

It should be noted that the E-UTRAN 101 may address multiple UEs within the paging message transmitted in 1415 by including one Paging-Record for each UE. E-UTRAN 101 may also indicate a change of system information, and/or provide an ETWS notification or a CMAS notification in the Paging message. In the UE the paging information is provided to upper layers, which in response may initiate the RRC connection establishment procedure (or, generally speaking, a "Service Request" 1416 as shown in FIG. 14), e.g. to receive an incoming call.

In the following, examples for the signaling of a paging cause for D2D communication (e.g., to trigger the UE 1401 to switch on the required D2D transceiver) and the UE behavior after reception of the paging cause (e.g., kick-off of a D2D specific procedures) are described.

Signaling of Paging Cause for D2D Communication

In the following section several signaling examples (i.e. forms of the paging message transmitted in 1415) are given. In these examples, the reception of the paging message acts as a trigger point so that the mobile terminal 105 (or a plurality of mobile terminals) is triggered to prepare for some sort of D2D activity well in advance (e.g., to turn on its WiFi module and sniff on the available peer entities to find other devices in its vicinity).

An example in which a parameter D2D-Proximity-Detection is included to the paging message (specifically in the UE's individual Paging-Record) is illustrated in table 1.

TABLE 1

| | | | |
|---|---|---|---|
| 1 | -- ASN1START | | |
| 2 | | | |
| 3 | Paging ::= | SEQUENCE { | |
| 4 |    pagingRecordList | PagingRecordList | OPTIONAL |
| 5 |    systemInfoModification | ENUMERATED {true} | |
| |    OPTIONAL | | |
| 6 |    etws-Indication | ENUMERATED {true} | |
| |    OPTIONAL | | |
| 7 |    nonCriticalExtension | Paging-v890-IEs | |
| |    OPTIONAL | | |
| 8 | } | | |
| 9 | | | |
| 10 | Paging-v890-IEs ::= | SEQUENCE { | |
| 11 |    lateNonCriticalExtension | OCTET STRING | |
| |    OPTIONAL | | |
| 12 |    nonCriticalExtension | Paging-v920-IEs | |
| |    OPTIONAL | | |
| 13 | } | | |
| 14 | | | |
| 15 | Paging-v920-IEs ::= | SEQUENCE { | |
| 16 |    cmas-Indication-r9 | ENUMERATED {true} | |
| |    OPTIONAL | | |

TABLE 1-continued

```
17    nonCriticalExtension         SEQUENCE { }
      OPTIONAL
18  }
19
20  PagingRecordList ::=            SEQUENCE (SIZE (1..maxPageRec)) OF
      PagingRecord
21
22  PagingRecord ::=                SEQUENCE {
23    ue-Identity                     PagingUE-Identity,
24    cn-Domain                       ENUMERATED   {ps, cs},
25    D2D-Proximity-Detection         ENUMERATED {true}
      OPTIONAL
26    ...
27  }
28
29  PagingUE-Identity ::=           CHOICE {
30    s-TMSI                          S-TMSI,
31    imsi                            IMSI,
32    ...
33  }
34
35  IMSI ::=                        SEQUENCE (SIZE (6..21)) OF IMSI-Digit
36
37  IMSI-Digit ::=                  INTEGER (0..9)
38
39  -- ASN1STOP
```

Lines 22 to 27 is the paging record for the UE 1401. In line 25, the parameter D2D-Proximity-Detection is included. The presence of this parameter indicates to the UE 1401 that the cause for the paging event is proximity detection (e.g., in scope of ProSe Discovery). With this parameter the UE 1401 can prepare itself for the proximity detection procedure (e.g., turn on its WiFi module) well in advance in order to reduce latency.

An example in which a parameter D2D-Module-Control is included to the paging message (specifically in the UE's individual Paging-Record) is illustrated in table 2.

TABLE 2

```
1   -- ASN1START
2
3   Paging ::=              SEQUENCE {
4     pagingRecordList        PagingRecordList                OPTIONAL
5     systemInfoModification     ENUMERATED {true}
      OPTIONAL
6     etws-Indication            ENUMERATED {true}
      OPTIONAL
7     nonCriticalExtension       Paging-v890-IEs
      OPTIONAL
8   }
9
10  Paging-v890-IEs ::=     SEQUENCE {
11    lateNonCriticalExtension   OCTET STRING
      OPTIONAL
12    nonCriticalExtension       Paging-v920-IEs
      OPTIONAL
13  }
14
15  Paging-v920-IEs ::=     SEQUENCE {
16    cmas-Indication-r9         ENUMERATED {true}
      OPTIONAL
17    nonCriticalExtension       SEQUENCE { }
      OPTIONAL
18  }
19
20  PagingRecordList ::=    SEQUENCE (SIZE (1..maxPageRec)) OF
      PagingRecord
21
22  PagingRecord ::=        SEQUENCE {
23    ue-Identity             PagingUE-Identity,
24    cn-Domain               ENUMERATED   {ps, cs},
25    D2D-Module-Control      ENUMERATED {on, off}
      OPTIONAL
26    ...
27  }
28
29  PagingUE-Identity ::=   CHOICE {
30    s-TMSI                  S-TMSI,
31    imsi                    IMSI,
32    ...
```

TABLE 2-continued

| 33 | } | |
|---|---|---|
| 34 | | |
| 35 | IMSI ::= | SEQUENCE (SIZE (6..21)) OF IMSI-Digit |
| 36 | | |
| 37 | IMSI-Digit ::= | INTEGER (0..9) |
| 38 | | |
| 39 | -- ASN1STOP | |

Lines 22 to 27 is the paging record for the UE 1401. In line 25, the parameter D2D-Module-Control is included. This parameter can take on two values: if set to "on" the UE 1401 shall turn on its D2D Module and if set to "off" the UE 1401 shall turn off its D2D Module.

An example in which a parameter Prepare-for-D2D-Action is included to the paging message (specifically in the global part of the paging message) is illustrated in table 3.

It should be noted that the names of the added parameters elements listed in the paging messages as given in tables 1 to 3 above are just examples. Other parameter names and different encoding variants are possible. Also, the parameter Prepare-for-D2D-Action may appear in a UE's individual Paging-Record, and the parameters D2D-Proximity-Detection or D2D-Module-Control may appear in the global part of the Paging-Message. The paging message as given in the

TABLE 3

| 1 | -- ASN1START | | |
|---|---|---|---|
| 2 | | | |
| 3 | Paging ::= | SEQUENCE { | |
| 4 |   pagingRecordList | PagingRecordList | OPTIONAL |
| 5 |   systemInfoModification<br>  OPTIONAL | ENUMERATED {true} | |
| 6 |   etws-Indication<br>  OPTIONAL | ENUMERATED {true} | |
| 7 |   Prepare-for-D2D-Action<br>  OPTIONAL | ENUMERATED {true} | |
| 8 |   nonCriticalExtension<br>  OPTIONAL | Paging-v890-IEs | |
| 9 | } | | |
| 10 | | | |
| 11 | Paging-v890-IEs ::= | SEQUENCE { | |
| 12 |   lateNonCriticalExtension<br>  OPTIONAL | OCTET STRING | |
| 13 |   nonCriticalExtension<br>  OPTIONAL | Paging-v920-IEs | |
| 14 | } | | |
| 15 | | | |
| 16 | Paging-v920-IEs ::= | SEQUENCE { | |
| 17 |   cmas-Indication-r9<br>  OPTIONAL | ENUMERATED {true} | |
| 18 |   nonCriticalExtension<br>  OPTIONAL | SEQUENCE { } | |
| 19 | } | | |
| 20 | | | |
| 21 | PagingRecordList ::=<br>PagingRecord | SEQUENCE (SIZE (1..maxPageRec)) OF | |
| 22 | | | |
| 23 | PagingRecord ::= | SEQUENCE { | |
| 24 |   ue-Identity | PagingUE-Identity, | |
| 25 |   cn-Domain | ENUMERATED {ps, cs}, | |
| 26 |   ... | | |
| 27 | } | | |
| 28 | | | |
| 29 | PagingUE-Identity ::= | CHOICE { | |
| 30 |   s-TMSI | S-TMSI, | |
| 31 |   imsi | IMSI, | |
| 32 |   ... | | |
| 33 | } | | |
| 34 | | | |
| 35 | IMSI ::= | SEQUENCE (SIZE (6..21)) OF IMSI-Digit | |
| 36 | | | |
| 37 | IMSI-Digit ::= | INTEGER (0..9) | |
| 38 | | | |
| 39 | -- ASN1STOP | | |

Lines 3 to 9 include parameters applicable for all mobile terminal 105 receiving the paging message. Line 7 holds the parameter Prepare-for-D2D-Action. The presence of this parameter indicates to the UE 1401 that this paging event is related to D2D.

above examples inform the UE 1401 about the reason for this Paging-Message, so that the UE 1401 can easily see whether it is related to D2D and control its D2D module (e.g., WiFi or Bluetooth transceivers) accordingly. Generally speaking, upon detection of a D2D indicator in the paging message, the UE 1401 is enabled to adjust/adapt its D2D behavior according to the type of this D2D indicator and/or to the field values of these D2D parameters. For this, also combinations of D2D related parameters can be used, as shown in the following example. In other words, the term "D2D indicator" may comprise a set of parameters.

An example with a combination of parameters for D2D communication being included in the paging message (specifically in the global part of the paging message) is illustrated in table 4.

communication. In contrast or in addition to the parameter D2D-Communication that may be used to indicate that a particular paging event is related to the ProSe Communication scenario, another parameter D2D-Public-Safety may be defined for the ProSe Public Safety scenario. It may be used to indicate to the UE 1401 that the motive for a particular paging event is D2D-Public-Safety.

The meaning of some fields that may be included in the paging messages illustrated in tables 1 to 4 are given in table 5.

TABLE 4

```
1   -- ASN1START
2
3   Paging ::=               SEQUENCE {
4       pagingRecordList         PagingRecordList             OPTIONAL
5       systemInfoModification   ENUMERATED {true}
        OPTIONAL
6       etws-Indication          ENUMERATED {true}
        OPTIONAL
7       D2D-Module-Control       ENUMERATED {on, off}
        OPTIONAL
8       D2D-Proximity-Detection  ENUMERATED {true}
        OPTIONAL
9       D2D-Communication        ENUMERATED {true}
        OPTIONAL
10      nonCriticalExtension     Paging-v890-IEs
        OPTIONAL
11  }
12
13  Paging-v890-IEs ::=      SEQUENCE {
14      lateNonCriticalExtension OCTET STRING
        OPTIONAL
15      nonCriticalExtension     Paging-v920-IEs
        OPTIONAL
16  }
17
18  Paging-v920-IEs ::=      SEQUENCE {
19      cmas-Indication-r9       ENUMERATED {true}
        OPTIONAL
20      nonCriticalExtension     SEQUENCE { }
        OPTIONAL
21  }
22
23  PagingRecordList ::=     SEQUENCE (SIZE (1..maxPageRec)) OF
        PagingRecord
24
25  PagingRecord ::=         SEQUENCE {
26      ue-Identity              PagingUE-Identity,
27      cn-Domain                ENUMERATED   {ps, cs},
28      ...
29  }
30
31  PagingUE-Identity ::=    CHOICE {
32      s-TMSI                   S-TMSI,
33      imsi                     IMSI,
34      ...
35  }
36
37  IMSI ::=                 SEQUENCE (SIZE (6..21)) OF IMSI-Digit
38
39  IMSI-Digit ::=           INTEGER (0..9)
40
41  -- ASN1STOP
```

Lines 3 to 11 include parameters applicable for all mobile terminal 105 receiving the paging message. Line 7 holds the parameter D2D-Module-Control as described above, line 8 holds the parameter D2D-Proximity-Detection as described above. Line 9 holds the parameter for D2D communication. The presence of this parameter indicates to the UE 1401 that the cause for this paging event is D2D-Communication (e.g. in scope of the ProSe Communication scenario). It may be used in conjunction with the other parameters for D2D

TABLE 5

| Paging field descriptions |
| --- |
| cmas-Indication<br>If present: indication of a CMAS notification.<br>cn-Domain<br>Indicates the origin of paging.<br>etws-Indication<br>If present: indication of an ETWS primary notification and/or ETWS secondary notification. |

TABLE 5-continued

Paging field descriptions imsi
The International Mobile Subscriber Identity, a globally unique permanent subscriber identity, see TS 23.003 [27]. The first element contains the first IMSI digit, the second element contains the second IMSI digit and so on.
systemInfoModification
If present: indication of a BCCH modification other than SIB10, SIB11 and SIB12.
ue-Identity
Provides the NAS identity of the UE that is being paged.

UE Behavior after Reception of Paging Cause for D2D Communication

In this example, the E-UTRAN 101 initiates the paging procedure after detecting a need for D2D-Activity for the mobile terminal 1401 by transmitting the paging message at the UE's paging occasion. In the course of paging the base station 1402 first broadcasts a paging indicator on the PDCCH followed by the actual RRC-Paging-Message on the PDSCH in 1415. A process performed by the UE 1401 in the event of paging is shown in FIG. 15.

Figure 15:
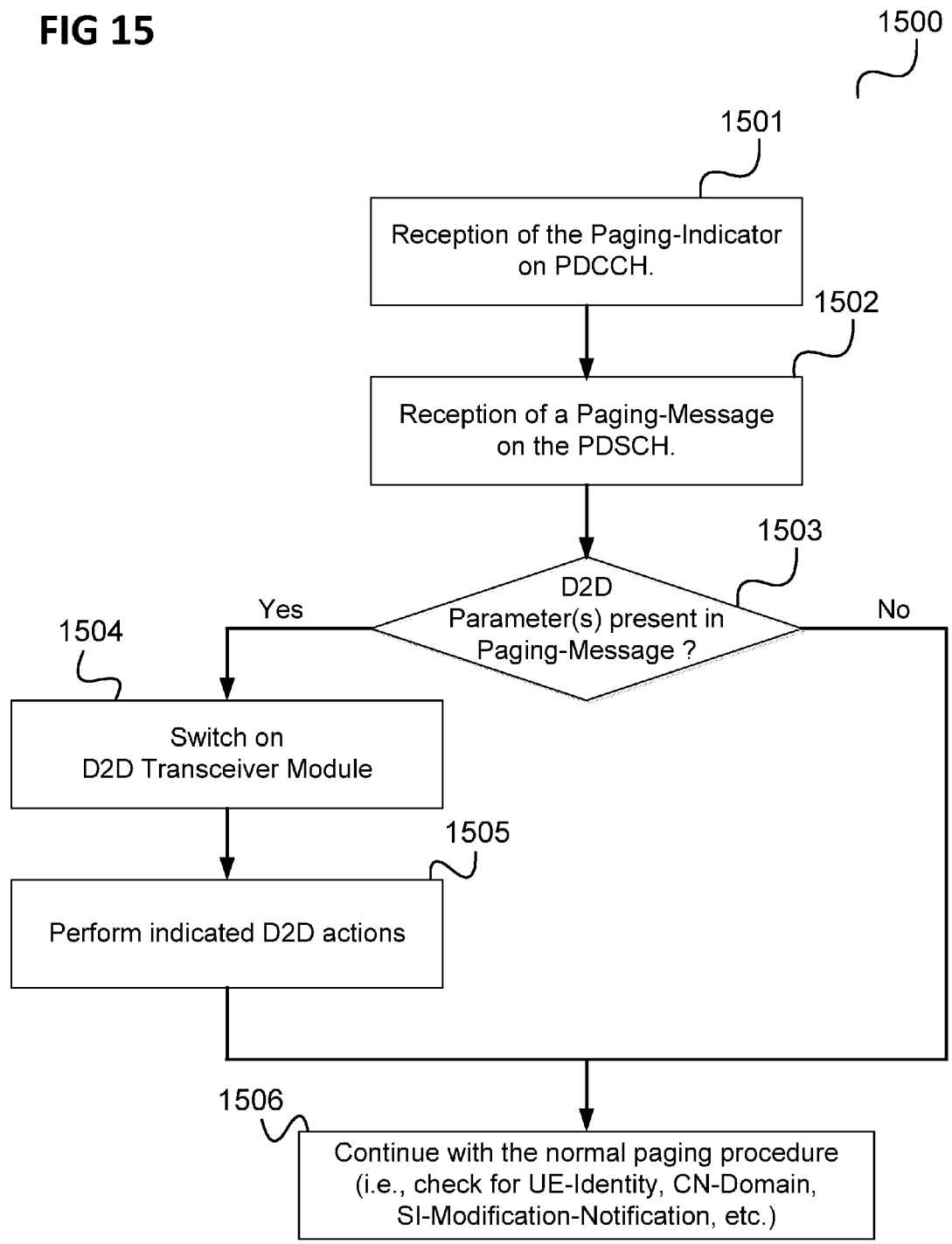
FIG. 15 shows a flow diagram illustrating a processing of a paging message.

FIG. 15 shows a flow diagram 1500.

In 1501, the UE 1401 receives the paging indicator on the PDCCH.

In 1502, the UE 1402, receives the paging message (RRC Message) on the PDSCH.

In 1503, the UE 1401 checks whether the paging message contains D2D related information elements. For example, these may be:
  a. D2D-Module-Control
  b. D2D-Proximity-Detection
  c. D2D-Communication
  d. D2D-Public-Safety
  e. Prepare-for-D2D-Action
  f. Combinations thereof In case the paging message does not contain D2D related information elements (e.g. an indication to prepare for a D2D communication) the UE 1401 continues with 1506.

In case the paging message contains D2D related information elements (e.g. an indication to prepare for a D2D communication) the UE 1401 in 1504 takes appropriate actions. These actions may be based on field values of the D2D related information elements in the paging message, such as the parameters described above with reference to tables 1 to 4. Examples for actions based on these parameters are given in table 6.

TABLE 6

List of possible D2D related information and actions to be taken by UE.

| Received parameter/value | Action to be taken |
| --- | --- |
| D2D-Module-Control/on (off) | turn on (off) Transceiver Module 2 |
| D2D-Proximity-Detection/true | perform proximity detection of peer entities |
| D2D-Communication/true | Start D2D link establishment to (previously) indicated device (e.g., for commercial usage) |
| D2D-Public-Safety/true | Start D2D link establishment to (previously) indicated device (e.g., for usage in case of emergency) |
| Prepare-for-D2D-Action/true | turn on Transceiver Module 2 |

For example, if the paging message contains D2D related information elements with corresponding field values, the UE 1401 switches on its D2D transceiver module (also referred to herein as Transceiver Module 2) in 1504 and performs indicated D2D actions in 1505. The UE 1401 continues with 1506.

In 1506, the UE 1401 continues with the normal paging procedure (e.g. with 1416), e.g. in parallel to the execution of a D2D related command (if any), or after a D2D related command (if any) has been executed.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication terminal comprising;
   a receiver to receive a paging message;
   a detector to determine whether the paging message includes a first indicator to instruct the communication terminal to prepare a direct communication device-to-communication device (D2D) communication and a second indicator to instruct the communication terminal to activate a D2D communication module;
   a controller to prepare the D2D communication when the paging message includes the first indicator and to activate the D2D communication module when the paging message includes the second indicator, wherein the activation is to take place before a radio resource control (RRC) connection establishment procedure is completed; and
   the D2D communication module is to establish a D2D communication session in response to the preparation of the D2D communication.

2. The communication terminal according to claim 1, wherein the controller is to allocate resources for the D2 communication before the RRC connection establishment procedure is completed when the paging message includes the first indicator and the second indicator.

3. The communication terminal according to claim 2, wherein the resources comprise memory space.

4. The communication terminal according to claim 2, wherein the resources comprise computational resources.

5. The communication terminal according to claim 1, wherein the paging message further includes a third indicator to instruct the communication terminal to perform a D2D proximity detection procedure, and the controller is to instruct the D2D communication module to perform the D2D proximity detection procedure when the paging message includes the third indicator.

6. The communication terminal according to claim 1, wherein the D2D communication module includes a short range communication transceiver.

7. The communication terminal according to claim 1, wherein the D2D communication module is a WiFi communication module or a Bluetooth communication module.

8. The communication terminal according to claim 1, wherein the receiver is to receive the paging message from a base station of a cellular radio communication network and the D2D communication is a communication bypassing the base station.

9. The communication terminal according to claim 1, wherein the D2D communication is a communication with another communication terminal.

10. One or more non-transitory computer-readable media including instructions to cause a communication terminal, in response to execution of the instruction by the communication terminal, to receive a paging message;

determine whether the paging message includes a first indicator, a second indicator, and a third indicator, wherein the first indicator is for preparation of a direct communication device-to-communication device (D2D) communication, the second indicator is for activation, of a D2D communication module, and the third indicator is to indicate a cause of the paging message, wherein the cause of the paging message is D2D proximity detection, D2D communication, or D2D Public Safety;

activate, in response to receipt of the paging message, a D2D communication module to establish a D2D communication session when the paging message includes the second indicator, and wherein activation of the D2D communication module takes place before a radio resource control (RRC) connection establishment procedure is completed;

prepare, in response to receipt of the paging message, the D2D communication when the paging message includes the first indicator, and wherein preparation of the D2D communication takes place before the RRC connection establishment procedure is completed; and establish the D2D communication session such that initiation of the D2D communication session takes place before the RRC connection establishment procedure is completed.

11. The one or more non-transitory computer-readable media of claim 10, wherein execution of the instructions by the communication terminal causes the communication terminal to receive the paging message from a base station of a cellular radio communication network.

12. A communication device comprising:

a message generator to generate a paging message including a first indicator to instruct a communication terminal to prepare a direct communication device-to-communication device (D2D) communication and a second indicator to indicate a cause for the generation of the paging message is D2D proximity detection; and a transmitter to transmit the paging message to the communication terminal, to establish a D2D communication session wherein establishment of the D2D communication session is initiated in response to receipt of the paging message and before a radio resource control (RRC) connection establishment procedure is completed.

13. The communication device according to claim 12, wherein the communication device is a base station.

14. The communication device according to claim 13, wherein the message generator is to include the first indicator and the second indicator in a section of the paging message applicable for all communication terminals which are to receive the paging message.

15. The communication device according to claim 13, wherein the message generator is to include the first indicator and the second indicator in a section of the paging message applicable only to the communication terminal.

16. The communication device according to claim 13, wherein the message generator is further to include into the paging message a third indicator to specify that the cause of the transmission of the paging message is the D2D communication, a fourth indicator to specify that the cause of the paging message is D2D Public Safety, and a fifth indicator to instruct the communication terminal to turn on a D2D communication module or turn off the D2D communication module.

17. One or more non-transitory computer-readable media including instructions to cause a communication device, in response to execution of the instructions by the communication device, to:

generate a paging message including a first indicator to instruct a communication terminal to prepare a direct communication device-to-communication device (D2D) communication and a second indicator to instruct the communication terminal to turn on a D2D communication module or turn off the D2D communication module; and transmit the paging message to the communication terminal to establish a D2D communication session, wherein the establishment of the D2D communication is initiated in response to receipt of the paging message and before a radio resource control (RRC) connection establishment procedure is completed.

18. The one or more non-transitory computer-readable media of claim 17, wherein execution of the instructions by the communication terminal, cause the communication terminal to include, into the paging message, a third indicator specifying that a cause of the paging message is D2D communication, D2D Proximity Detection, or D2D Public Safety.

* * * * *